(12) United States Patent
Lucas

(10) Patent No.: US 6,996,538 B2
(45) Date of Patent: Feb. 7, 2006

(54) INVENTORY CONTROL SYSTEM AND METHODS

(75) Inventor: Michael T. Lucas, Calabasas, CA (US)

(73) Assignee: Unisone Corporation, New Castle, DE (US)

( * ) Notice: Subject to any disclaimer, the term of this patent is extended or adjusted under 35 U.S.C. 154(b) by 672 days.

(21) Appl. No.: 09/799,879

(22) Filed: Mar. 7, 2001

(65) Prior Publication Data

US 2001/0051905 A1 Dec. 13, 2001

Related U.S. Application Data

(60) Provisional application No. 60/187,389, filed on Mar. 7, 2000.

(51) Int. Cl.
*G06F 17/60* (2006.01)

(52) U.S. Cl. ............................................. 705/28; 705/26
(58) Field of Classification Search ................ 705/2, 705/29, 28
See application file for complete search history.

(56) References Cited

U.S. PATENT DOCUMENTS

| | | | | |
|---|---|---|---|---|
| 4,153,931 A | * | 5/1979 | Green et al. ................ 364/200 |
| 5,168,445 A | | 12/1992 | Kawashima et al. ........ 365/403 |
| 5,537,313 A | * | 7/1996 | Pirelli ......................... 364/403 |
| 5,592,374 A | * | 1/1997 | Fellegara et al. ........... 395/203 |
| 5,608,621 A | | 3/1997 | Caveney et al. ............ 395/216 |
| 5,610,811 A | * | 3/1997 | Honda ........................ 395/202 |
| 5,638,516 A | | 6/1997 | Duzett et al. ............... 395/200 |
| 5,638,519 A | | 6/1997 | Haluska ...................... 395/228 |
| 5,712,989 A | * | 1/1998 | Johnson et al. ............... 705/28 |
| 5,732,401 A | * | 3/1998 | Conway ........................ 705/29 |
| 5,737,539 A | * | 4/1998 | Edelson et al. ............. 395/203 |
| 5,758,095 A | * | 5/1998 | Albaum et al. ............. 395/202 |
| 5,893,076 A | | 4/1999 | Hafner et al. ................. 705/28 |
| 5,920,317 A | | 7/1999 | McDonald ................... 345/356 |
| 5,953,707 A | | 9/1999 | Huang et al. ................. 705/10 |
| 5,983,198 A | | 11/1999 | Mowery et al. .............. 705/22 |
| 5,986,219 A | * | 11/1999 | Carroll et al. ................. 177/1 |
| 5,991,728 A | * | 11/1999 | DeBusk et al. ................ 705/2 |
| 6,002,344 A | * | 12/1999 | Bandy et al. .............. 340/10.2 |
| 6,021,392 A | * | 2/2000 | Lester et al. ................... 705/2 |
| 6,151,582 A | | 11/2000 | Huang et al. ................... 705/8 |
| 6,169,483 B1 | * | 1/2001 | Ghaffari et al. .......... 340/572.3 |
| 6,249,774 B1 | | 6/2001 | Roden et al. ................. 705/28 |
| 6,294,999 B1 | * | 9/2001 | Yarin et al. ............... 340/573.1 |
| 6,341,271 B1 | | 1/2002 | Salvo et al. .................. 705/28 |
| 6,354,493 B1 | * | 3/2002 | Mon .......................... 235/380 |
| 6,681,990 B2 | | 1/2004 | Vogler et al. ............... 235/385 |
| 2002/0161688 A1 | * | 10/2002 | Stewart et al. ................ 705/37 |

FOREIGN PATENT DOCUMENTS

JP          410097574 A  *  4/1998

OTHER PUBLICATIONS mySAP.com Business Scenarios in Action at SAPPHIRE '99; Business Wire, Sep. 14, 1999.*
Nonstop Solutions Acquires Supply Chain Solutions, PR Newswire, Jan. 17, 2000.*

(Continued)

*Primary Examiner*—Steven B. McAllister
(74) *Attorney, Agent, or Firm*—Nath & Associates PLLC; Gregory B. Kang; Lee C. Heiman

(57) ABSTRACT

A system and method which allows third-parties to monitor company inventory via the Internet and World Wide Web ("web") and automatically order needed items. The present invention also provides a forum through which resellers and customers may directly interact to resell surplus and used equipment. The present invention may also allow a third party to act as a broker, thereby assuring that both the equipment purchased is actually delivered, and that the seller is properly compensated.

96 Claims, 5 Drawing Sheets

OTHER PUBLICATIONS

Selling inbound logistics services: Understanding the buyer's perspective; Maltz, Arnold and Ellram, Lisa; Journal of Business Logistics; v. 12, n. 2.*

Beware the pitfalls of Internet procurement; Welty, Terry; Communications News, Mar. 2000.*

John Bermudez "Advanced Planning and Scheduling: Is It as Good as it Sounds?" *The Report on Supply Chain Management,* Mar. 1998, Advanced Manufacturing Research pp. 1–24.

Datta, Shoumen, "RFID . . . an incomplete story," MIT Forum for Supply Chain Innovation, School of Engineering, Massachusetts Institute of Technology, Cambridge, Massachusetts, 2001, pp. 1–37.

Mayberry, Robert, "IBM SCM RFID Solutions," Presentation slides, IBM Corporation, Jun. 2004, pp. 1–31.

Maney, Kevin, "New Chips Could Make Everyday Items 'talk'," http://www.usatoday.com/money/covers/2004-4-12-tiny-band.htm, Apr. 2002, website printout pp. 1–5.

"Emerging Technologies," The Auto–ID Lab at MIT, web page from the website of Food Marketing Institute, web printout p. 1.

"Summary," web page from the website of Auto–ID Center, web printout, p. 1, Apr. 2002.

"Applications," web page from the website of Auto–ID Center, web printout, p. 1, Apr. 2002.

"Reinventing the Supply Chain," web page from the website of Auto–ID Center, web printout, p. 1, Apr. 2002.

"What is the history of the Auto–ID Center?," web pages from the website of Auto–ID Center, web printout, pp. 1–2, Apr. 2002.

Search result page from the website of Auto–ID Center, web printout, p. 1, Apr. 2002.

Question page from the website of Auto–ID Center, web printout, p. 1, Apr. 2002.

* cited by examiner

INVENTORY CONTROL SYSTEM AND METHODS

PRIORITY AND COPYRIGHT CLAIMS

This application claims the benefit of U.S. Provisional Patent Application Ser. No. 60/187,389 filed Mar. 7, 2000, the entire disclosure of which is incorporated herein by reference.

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD OF THE INVENTION

The present invention relates to the field of electronic inventory control. In particular, the present invention relates to controlling healthcare supply inventories.

BACKGROUND OF THE INVENTION

Traditionally, inventory control has been done by the company or organization using the items in the inventory. In smaller offices, inventory control is typically not a high priority, and orders may be placed whenever items are out of stock.

As an office increases in size, inventory management becomes more of a challenge, and monitoring of frequently used or crucial items becomes very important. Typically a person is given the responsibility of monitoring inventory and ordering replacements as supply diminishes. As a company further increases in size, more advanced inventory management techniques may be used. For example, supply and usage trends may be analyzed to determine minimum quantities on hand, and seasonal or other peak usage may be determined.

Some larger offices have switched to automated or semi-automated inventory tracking systems. These automated systems utilize barcode scanners or other electronic identifiers to track outgoing and incoming inventory, and can prepare purchase requests as supplies diminish.

SUMMARY OF THE INVENTION

The present invention improves upon the prior art by shifting the burden of inventory tracking onto a third party; this concept is referred to as vendor managed inventory, or VMI. When a third party provides VMI services for multiple companies, it gains significant buying power which it can use to negotiate better deals, improve supplier responsiveness, and streamline the buying process.

The present invention allows third-parties to monitor company inventory via the Internet and World Wide Web ("web"). In addition, the present invention allows small to medium sized companies to take advantage of VMI by providing a cost-effective solution to their inventory tracking needs.

The present invention utilizes web-enabled technologies to revolutionize inventory management by tracking inventory and automatically contacting suppliers, manufacturers, or distributors when additional supplies are needed. This may result in a labor reduction as compared to the labor-intensive inventory maintenance systems currently deployed.

In addition to reducing labor costs, the present invention may help a company cut other costs. The present invention may help reduce delivery costs by regularly ordering supplies in anticipation of need, thus obviating the need for express shipments. The present invention may also allow third parties to take advantage of manufacturer or distributor specials when offered for the products its customers require, thus further reducing customer cost.

While purchasing is a large part of inventory maintenance, the present invention may also facilitate other transactions as well. For example, the present invention may allow customers to resell products or equipment to other businesses, thereby maximizing utility. Although some in the prior art, such as Neoforna.com and Medibuy.com, have attempted to provide business-to-business equipment resale through web-based auctions, auctions do not provide equipment availability assurances. The present invention provides a forum through which resellers and customers may interact, where the present invention acts as a broker, thereby assuring both that purchased equipment is delivered, and that a seller receives proper compensation.

DETAILED DESCRIPTION OF THE PREFERRED EMBODIMENT

The present invention implements an Internet-based, vendor managed inventory ("VMI") system. A VMI system allows a customer to reduce costs by pushing inventory management responsibilities onto a third party, or manager. Managers may service multiple companies, thus allowing them to negotiate better deals, improve supplier responsiveness, and serve as an effective customer advocate.

The present invention allows managers to inexpensively monitor customer inventory via the Internet and World Wide Web ("web"). The present invention utilizes web-enabled technologies to revolutionize inventory management by tracking inventory and automatically contacting suppliers, manufacturers, or distributors when products are needed. This may result in a labor reduction as compared to the labor-intensive inventory maintenance systems currently deployed.

Figure 1:
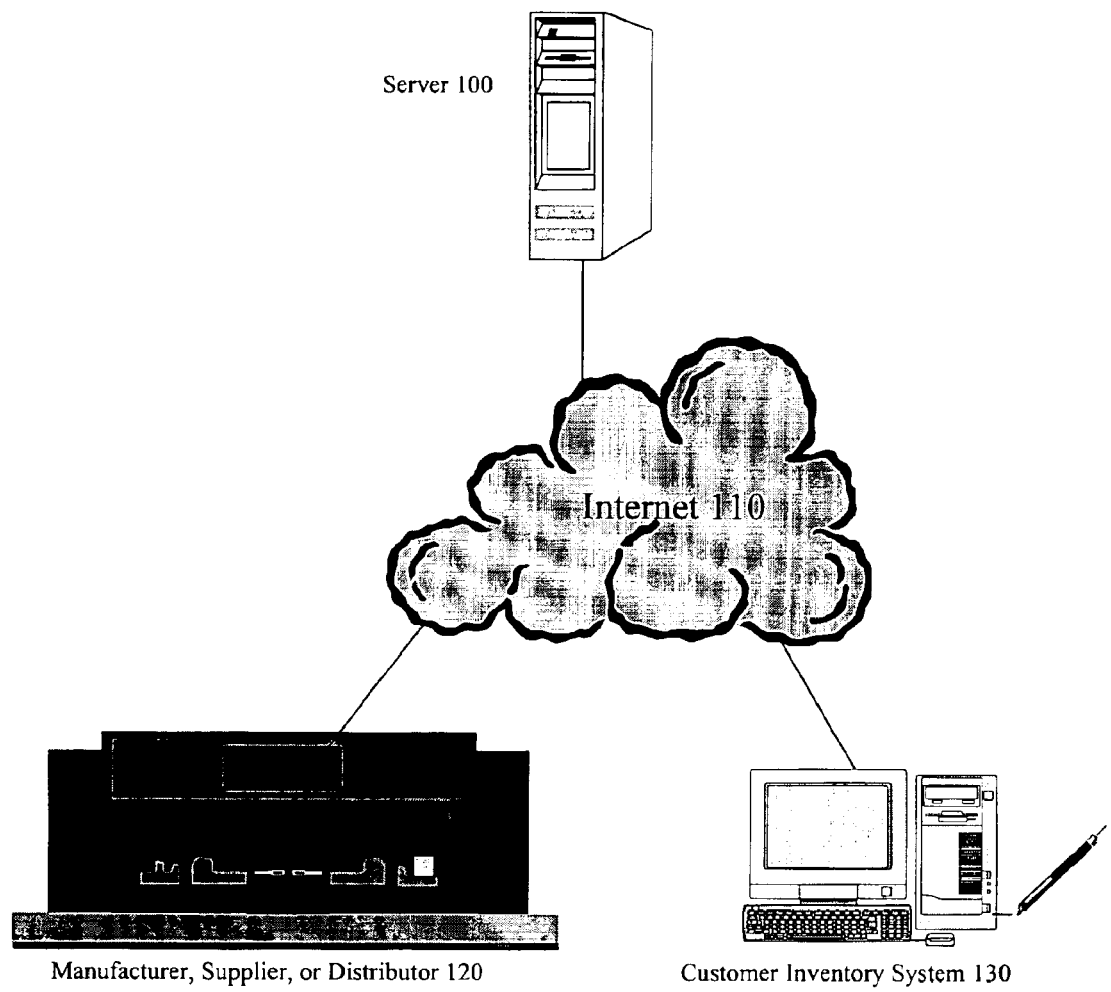
FIG. 1 is a block diagram illustrating the major hardware components of the present invention.

FIG. 1 is a block diagram illustrating the major hardware components of the present invention. As illustrated in FIG. 1, the present invention utilizes a client/server architecture to facilitate communication between customer inventory systems and managers. A client running on a Customer Inventory System 130 may be used to track inventory, place special orders, and interact with other customers.

A client may include custom software, such as an application written in Visual Basic, JAVA, or C; commercial software, such as a web page accessible through a web browser; or a combination of custom and commercial software, such as a "plug-in" which operates in a web browser. Examples of common web browsers include Internet Explorer, developed by Microsoft Corporation of Redmond, Wash., and Navigator, developed by Netscape Corporation of Mountain View, Calif.

Customer Inventory Systems 130 may allow manual inventory tracking, semi-automated inventory tracking, or inventory may be dispensed using automated systems. By way of example, without intending to limit the present invention, a preferred embodiment of the present invention includes a handheld device, such as a Palm VII device by Palm Computing, Inc., to be outfitted with a barcode scanner. Such a device can allow barcodes or other identifiers associated with each inventory item to be scanned or otherwise entered into the system prior to or at the time of item distribution. As each item is scanned, a count maintained by the present invention may be adjusted to properly track inventory levels. Recipient-specific labels, including product warnings and other information, can then be printed for each scanned item.

Other inventory distribution methods contemplated include, but are not limited to, interfacing the present invention with vending machines. Vending machines may allow accurate inventory tracking without requiring human interaction, except to periodically restock a particular supply or group of supplies. In a preferred embodiment, vending machines may include security measures to prevent unauthorized supply distribution. Such security measures may include, but are not limited to, the use of an identification card and personal identification number ("PIN"), and biometric systems. Vending machines equipped with security systems may restrict access to specific supplies on an individual-by-individual level, or group-by-group basis. Vending machines may also be equipped with label printers that allow warnings and other information to be attached to a dispensed item's packaging.

Figure 5:
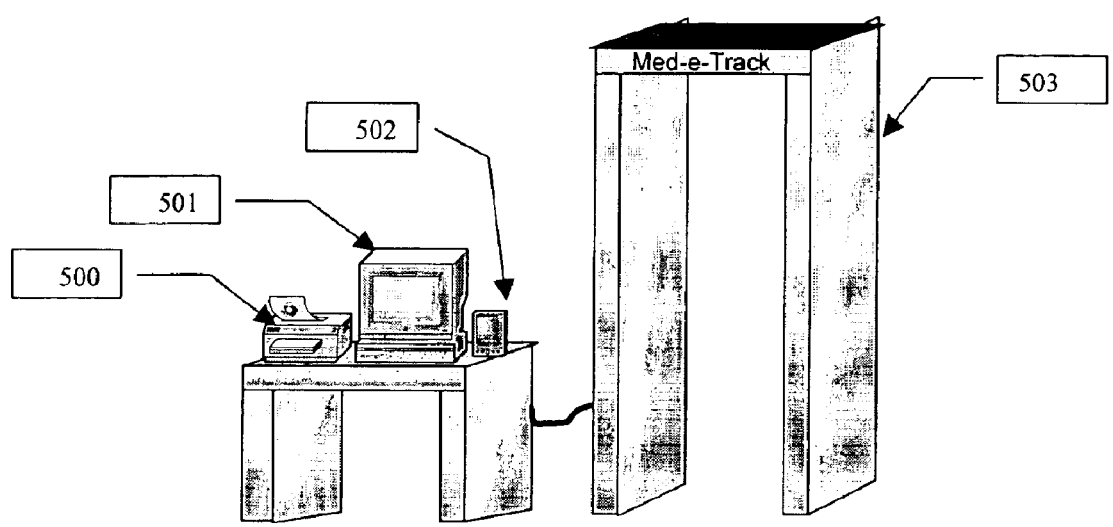
FIG. 5 illustrates a sample RFID portal and related computer equipment.

Alternatively, supply closets or other storage areas can be outfitted with a Radio Frequency Identification (RFID) portal, as illustrated in FIG. 5. An RFID portal (Block 500) is similar in structure to airport security metal detectors, except that RFID portals can detect or scan RFID tags as such tags pass through a portal. The present invention can monitor RFID tag identifiers, including identifiers assigned to individuals, such that access to a storage area can be monitored, and items removed by an individual can be tracked without any direct user interaction.

A preferred embodiment of the present invention can also track individual product dispensation, and may require additional information as products are dispensed. By way of example, without intending to limit the present invention, if a doctor dispenses sample medication to a patient, the present invention may also request a patient identifier, whereas if a package of gauze bandages was removed from inventory to restock an examination room, the present invention may not request a patient identifier. Patient identifiers can be used by the present invention to generate dispensation history reports for various products which may help suppliers and manufacturers to better understand income, race, ethnicity, or other demographic characteristics of typical recipients. The present invention may restrict such reports to only demographic information, and may not include individual-specific information in such reports.

An alternative embodiment of the present invention allows physicians or others to carry a handheld device through which prescriptions can be written while talking with a patient. Such a handheld device can connect to a local inventory management system through a wireless or wired means, and, when appropriate, a prescribed item sample may be automatically dispensed by a vending machine. Alternatively, a message may be displayed at a nurse's station indicating the items to be pulled from inventory. When items are dispensed by a vending machine or pulled from inventory, inventory counts can be decremented as appropriate, and new orders can be placed as necessary.

As inventory is distributed, Customer Inventory System 130 may track supply usage habits to determine minimum acceptable quantities on-hand. Usage information may be studied for various periods of time, and the present invention may create an inventory usage model based on collected data. As models are created and refined, the present invention may modify minimum in-stock thresholds to reflect anticipated usage. As quantity in-stock approaches a calculated or specified threshold, Customer Inventory System 130 may automatically request new supplies from Server 100. Supply requests may include various information, including, but not limited to, urgency of request, customer willingness to accept alternative brands or sizes, billing information, and shipping information.

As Server 100 receives supply requests, Server 100 may request price quotes from several Manufacturer, Supplier, or Distributor 120's ("Distributor 120"). Distributor 120 may respond with quantity available, price, estimated delivery time, and other such information. Server 100 may then automatically evaluate each Distributor 120 response to find the best value given various factors associated with each customer request. When an appropriate Distributor 120 response is chosen, Server 100 may automatically arrange payment and shipping of requested supplies for Customer Inventory System 130.

Communication between Customer Inventory System 130, Server 100, and Distributor 120 may be achieved through various methods, including, but not limited to, hypertext transfer protocol ("HTTP"), file transfer protocol ("FTP"), simple mail transfer protocol ("SMTP"), or other such related methods.

Although purchasing is a large part of inventory maintenance, a preferred embodiment of the present invention may also facilitate communication between customers, provide a source of information dissemination, and encourage customer interaction. The present invention may facilitate customer communication by allowing customers to resell products, equipment, or excess inventory to other businesses. The present invention may allow information dissemination by providing an up to date catalog of available equipment and other inventory from which a customer may order. The present invention may facilitate customer communication by allowing managers and customers to author and distribute articles describing new rules, regulations, procedures, revenue generation prospects, or other information of interest to other customers.

Customer Inventory System 130 may serve as the primary source of customer interaction with the present invention. Articles, catalogs, inventory information, and other such information may be stored on Server 100, and Customer Inventory System 130 may communicate with Server 100 to obtain requested information.

Figure 2:
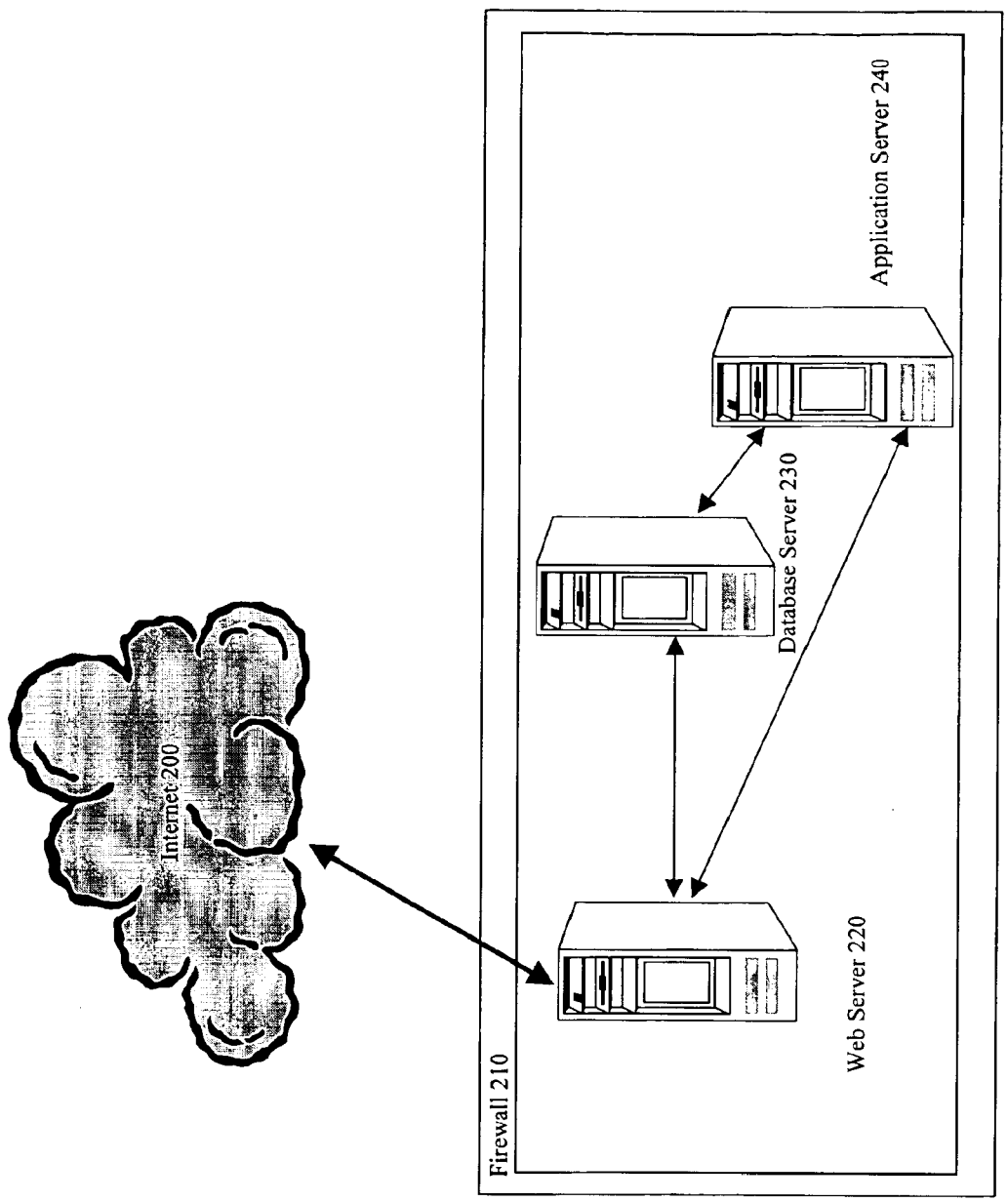
FIG. 2 is a block diagram illustrating an overview of the software components of the present invention.

FIG. 2 illustrates a preferred embodiment of Server 100, in which relationships between data storage, web server, and application services provided by Server 100 are illustrated. All client communications may first pass through Firewall 210. Firewall 210 represents a combination of software and hardware which is used to protect the data stored in Web Server 220, Database Server 230, and Application Server 240 from unauthorized access.

As previously described, clients may communicate with the present invention through various protocols, including HTTP. Web Server 220 represents software capable of transmitting and receiving information via HTTP or other protocols. Examples of such software include Internet Information Server, developed by Microsoft Corporation of Redmond, Wash.; Enterprise Server, developed by Netscape Corporation of Mountain View, Calif.; and Apache Server, developed by the Apache Software Foundation of Forest Hill, Md.

When a client requests information, Web Server 220 may determine whether a client request requires pre-processing, in which case a request is transferred to Application Server 240, or if a request simply requires data to fulfill the request, in which case Web Server 220 may communicate directly with Database Server 230.

Database Server 230 represents commercially available database software, such as Microsoft SQL Server, developed by Microsoft Corporation of Redmond, Wash., Oracle 8i, developed by Oracle Corporation, of Redwood Shores, Calif., or other, similar software. Database Server 230 may store raw data, such as customer inventory information, customer addresses, vendor names, vendor product classes, and other such similar information. Such information may be transmitted to a client by Web Server 220, or Application Server 240 may interpret information stored in Database Server 230 prior to transmission.

Application Server 240 may contain business rules associated with the present invention, which can be used to interpret Database Server 230 data prior to transmission of that data to a client. In addition to interpreting information stored in Database Server 230 for client use, Application Server 240 may also monitor inventory levels reflected in Database Server 230, contact vendors based on information from Database Server 230, adjust inventory information as new inventory is received, and provide the services necessary to facilitate business-to-business resale of equipment or products stored in Database Server 230.

Web Server 220, Database Server 230, and Application Server 240 each represent software which may run on the same computer, or on multiple computers. In addition, Application Server 240 may be implemented within Database Server 230 as a set of business rules.

An alternative description of the present invention follows, in which the present invention is described through a series of functional specifications. This information is included for enablement purposes, and describes the best mode contemplated at the time the present specification was filed. While the following functional specification describes a preferred embodiment of the present invention, descriptions within the functional specification should not be construed as limiting the present invention.

To avoid confusion, the following terms are used in this functional specification:

Customer—Refers to a buyer of products via the present invention. Customers can have "open account" relationships to avoid credit card and COD shipment problems.

Linked Supplier—A distinction is made to avoid confusion with other vendors doing business with the present invention, given that payables may be in a common accounts payable system. Distributors, manufacturers, or other vendors (collectively "suppliers"), are distinguished by whether they are using the present invention's inventory tracking and accounting software, and therefore have live Internet linkages into their databases for queries, order processing, and billing.

Manual Supplier—If a supplier provides goods or services through the present invention, but tracks inventory through a manual interface, such a supplier may be termed a "Manual Supplier". Open account relationships may be maintained between Linked or Manual Suppliers avoid payment complexities.

Non-linked Supplier—Suppliers not linked to the present invention.

Products—Items for sale via the present invention.

Customer Inventory—A list of products to be maintained at a given customer site.

In addition to the general definitions set forth above, this functions specification also defines a set of system functions. System functions may fall into one of the following general sub-system categories:

Interactive—human interface and related functions for tracking inventory counts, inventory consumption rates, ordering critical products, and the like. Interactive processes may be web-based or PC-based (client-server).

Nightly Processes—periodic processes through which orders can be generated and invoicing and related processes can be performed, including interaction with Distribution system at distributor warehouses.

Corporate—processes performed within corporate offices, but which update a database. Includes accounting, client data management, and other such processes.

Distribution—Linked Suppliers integrated with the present invention. Industry standard Enterprise Resource Planning (ERP) software may be bundled with commercial financial software to provide a complete business system to Linked Suppliers.

Database Design—A database schema which may be utilized in a preferred embodiment of the present invention.

The present invention in general, and this functional specification specifically, defines styles and functions included in detailed web pages and other user interface elements that are intended to be available system wide. Web pages, application windows, program screens, and transactions within the present invention should observe common rules. These rules include, but are not limited to:

No customer can view, inquiry into, update or in any way alter another customers data. Transactions can use an IP address or other unique identifier as a cross-check against a customer ID coming in with transmitted pages to insure rule enforcement. For such security procedures, customer IP addresses or other unique identifiers may only be changed through a function accessible only to Corporate staff.

No Linked Supplier can see data belonging to another linked supplier.

System parameters controlling customer options can be set through an account setup and editing process. Such a process may be accessed by only someone with an authorized identifier. Initially, such identifiers may only be given to Corporate Staff.

Data changes will generally be reflected by a transaction log or transaction history, which may be accessible to customers or distributors, and to which Corporate Staff with appropriate security levels may have access.

Figure 3:
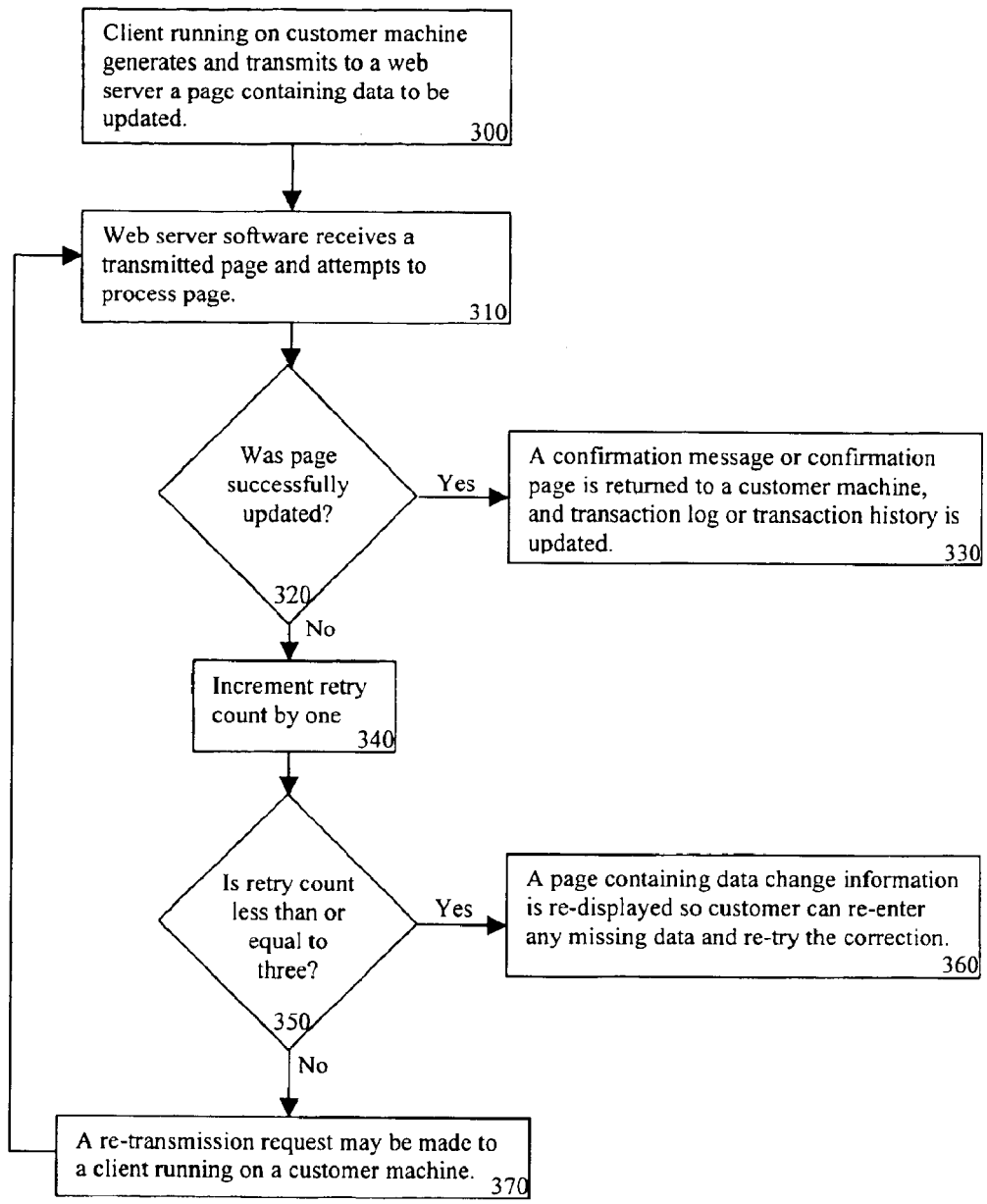
FIG. 3 is a process flow diagram illustrating sample logic implemented when client software attempts to update data stored in a server.

Functions involving data changes may be performed as server-side scripts, rather than through client-side logic. In general, such server-side scripts can utilize a logical flow similar to FIG. 3. As FIG. 3 illustrates, client software running on a customer machine may generate a page containing data to be updated by a web server and transmit said page to said web server (Block 300).

When a web server receives a page from a customer machine, the present invention may attempt to process any changes requested by said page. If such changes are successful (Block 320), the present invention may return a confirmation page or cause a confirmation message to be displayed to a customer machine, and appropriate transaction logging may occur.

If changes are not successful, the present invention may increment a retry count by one (Block 340 ). If the retry count is less than or equal to three, the present invention may retransmit customer changes (Block 370) to Block 310 in an effort to make any appropriate changes. If the retry count exceeds three (Block 350), the present invention may cause a page containing any error codes or other feedback information to be displayed on a client machine. Such a page may also contain original client data changes as well as a means for resubmitting said changes (Block 360).

Figure 4:
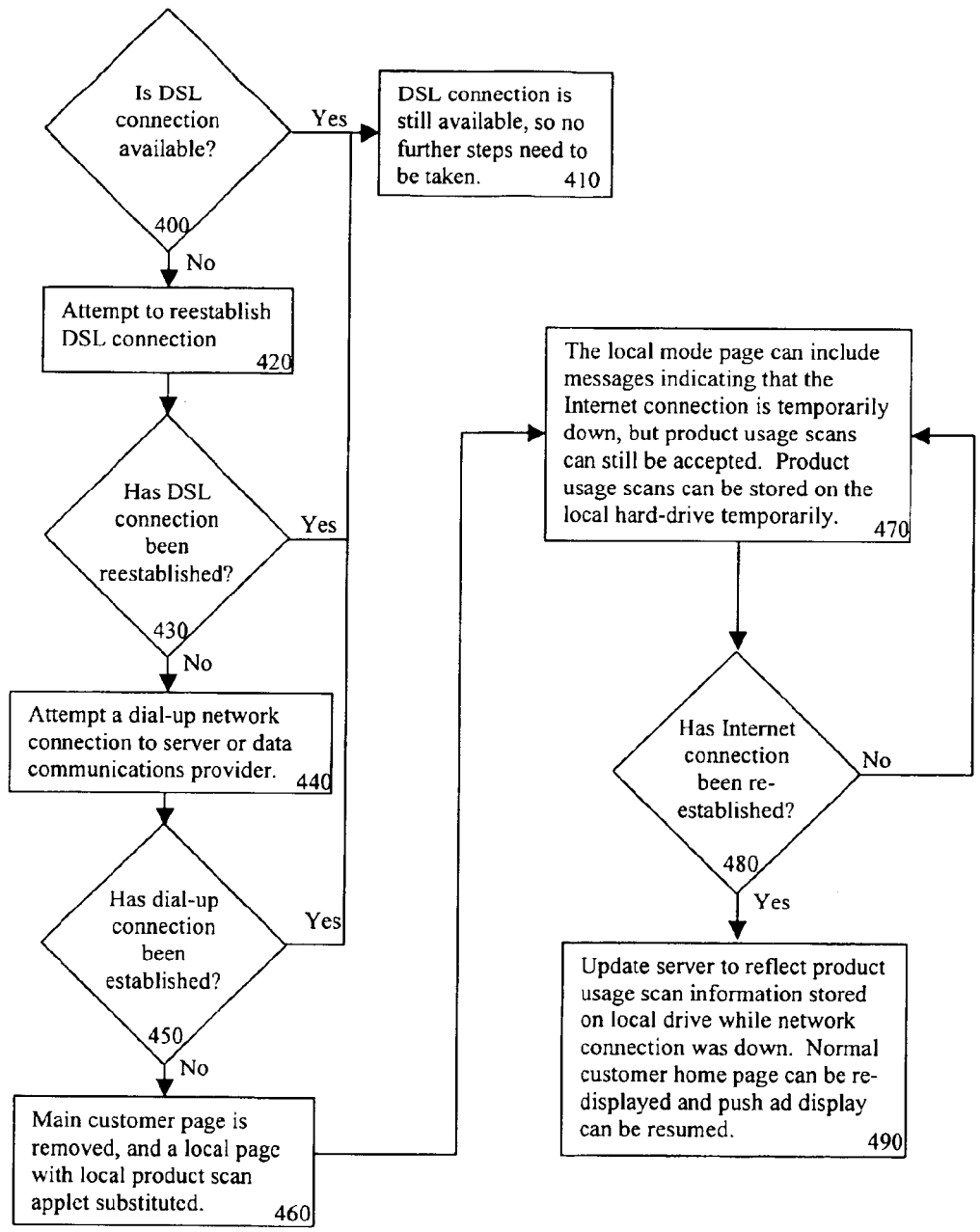
FIG. 4 is a process flow diagram illustrating sample logic implemented when client software polls a data connection.

Client software may also periodically verify that a data connection exists between said client software and a server acting as part of the present invention. Such software may follow the logic illustrated in FIG. 4 to achieve accurate data connection monitoring. As Block 400 illustrates, client software may send one or more TCP/IP Ping commands or other network test commands to verify that a high-speed connection is still available to a server acting as part of the present invention.

If a high-speed network connection is detected, the present invention can continue normal operations (Block 410). If a high-speed network connection is not detected, the present invention may attempt to reestablish such a connection (Block 420). If a high-speed network connection can be reestablished (Block 430), the present invention may continue normal operations (Block 410). If a high-speed network connection cannot be established, a lower speed network connection, such as a dial-up network connection, may be established by the present invention (Block 440). If a lower speed network connection can be established, the present invention may continue normal operations, including periodically attempting to reestablish a high-speed network connection (Block 410).

If a lower speed network connection cannot be established, client software may display an application or page with alternative user interface and alternative functionality (Block 460). Such alternative functionality can include local storage of product usage information, local inventory tracking, and limited reordering via a dial-up or other temporary connection with a known supplier (Block 470). A client functioning without a data connection may periodically attempt to reestablish high or low speed network connections (Block 480). When a connection is reestablished (Block 490), a client may transmit product usage scan information to a server acting as part of the present invention.

In addition to an inventory tracking application, the present invention may also utilize a high speed network connection to transmit new product offerings or special promotions to a client for display to a customer. As new products are entered into a Products table or similar data structure, the present invention may cause such a product to appear on a client. In a preferred embodiment, the present invention may allow customers to select products in which a customer is interested, and the present invention may only display new products or special deals meeting a customer's prior specifications. Such specifications can include, but are not limited to, categories by manufacturer, product trade name, specific product type, general product classification, and quantity available or quantity per shipping unit.

A client displaying such information may allow a customer to indicate an interest in a product by typing a command, clicking a button or other graphical interface element, or otherwise interacting with said client. If a customer expresses an interest in a featured product, a client may allow a customer to create a one-time order, or to configure recurring orders.

In addition to allowing customers to record product usage and order new inventory or new products, client software may also display advertisements on a rotating basis, and may be used for other purposes. A typical client software screen may also contain additional information and fields, including, but not limited to, a Product SKU field, a User-ID field, a Doctor-ID field, and a Sales Consultant Contact field.

When customers are not directly interacting with client software, client software may place a cursor in a Product SKU field by default. Placing a cursor in a Product SKU field can allow client software to ready accept an automatically or manually entered product identifier, such as a barcode label scanned via a wedge-style bar-code scanner.

As product identifiers are entered, client software may request a User-ID for each product identifier or set of product identifiers. A User-ID is a unique identifier created for each employee or set of employees within an organization. Such identifiers may be entered manually through an active user interface, such as, but not limited to, a keyboard, touch screen, or number pad, or through a passive user interface, such as, but not limited to, biometric recognition equipment, barcode identifiers worn by or associated with an employee, or through RFID tags worn by or associated with an employee. User-ID's may be combined with passwords to create a more secure inventory tracking system.

User-ID's may be used to track persons removing items from an inventory, but additional tracking or other controls may also be desirable. For example additional authorization may be required when employees remove expensive items or controlled substances from an inventory. The present invention may recognize when such an inventory item is removed, and client software may request an additional identifier, called a Doctor-ID, as authorization. Client software may even allow any user to enter a Doctor-ID for some inventory items, while for other inventory items a Doctor-ID and related password may be required. A biometric or other positive identifier may be used in place of a Doctor-ID or Doctor-ID and password in some applications.

When appropriate inventory tracking data has been entered into client software, the present invention may transmit such data to a server. A server may send a confirmation message to a client upon receipt of such data. If a confirmation message is not received within a predetermined period of time, the present invention may resend inventory tracking data. If successive resend attempts are unsuccessful, the present invention may follow a process similar to that illustrated by FIG. 3. Client software may allow additional inventory scans to occur while waiting for confirmation from a server.

In addition to recording inventory tracking information, client software may also allow a customer to access various options. Such options may include, but are not limited to, an administrative page, an inventory status inquiry page, and an inventory receipt page. An administrative page can allow authorized customers to create, edit, or remove User-ID's, Doctor-ID's, groups of such accounts, and account-specific information. An inventory status inquiry page can retrieve and display a page containing customer inventory records, order status, and other such information.

An inventory status inquiry may be initiated through client software, which can send a page containing customer-specific information, as well as site-specific identification information stored on a client machine. In a preferred embodiment, a server receiving such a request may select records with appropriate site- and user-specific information from a table of customer inventory records. A server may generate a page or screen containing customer inventory information, including information from several tables. Table 1 below provides an example of columns displayed on a typical inventory request screen, as well as sample table and field names from which such data can be drawn.

TABLE 1

| Column Heading | Source Table | Source Field |
| --- | --- | --- |
| Description | PRODUCTS | DESCRIPTION |
| Product | CUSTOMER_INVENTORY | PRODUCT |
| Quantity In Stock | CUSTOMER_INVENTORY | ON_HAND_QTY |
| Order Point | CUSTOMER_INVENTORY | ROP |

TABLE 1-continued

| Column Heading | Source Table | Source Field |
| --- | --- | --- |
| ReOrder Quantity | CUSTOMER_INVENTORY | ROQ |
| Activity Status | CUSTOMER_INVENTORY | STATUS |

An advantage of the present invention over the prior art is the ability to simplify adding new items or restocking items into an inventory. Linked Suppliers shipping goods to a customer can provide a specially coded packing list, and a customer can automatically or manually enter such a code into client software. Client software can validate a packing list number as belonging to a customer and ensure a packing list is not credited to a customer system more than once. Entry of an invalid or previously validated packing slip can cause client software to display an error message.

If a valid packing slip is entered, client software may retrieve shipment contents from a centralized database or from a supplier database, and automatically update customer inventory information to reflect inventory received. Client software may then display a message confirming successful inventory changes, and return a customer to a main page.

A product search page may also be accessible through client software. A product search page can allow a user to select a search type and, if appropriate, search parameters and search parameter values (collectively "search criteria"). By way of example, without intending to limit the present invention, a product search page may allow a customer to search by specific manufacturer and products of a certain classification.

When a customer has selected appropriate search criteria, client software may pass such search criteria to a server. A server may query a database of products and product descriptions and return products matching or approximating customer search criteria.

If a user has selected a descriptive search, a server may select records from a Products table, or other similar table, whose data matches or approximates descriptive text entered by a user. If a user has selected a parameter search, a server may select Product table records whose fields match or approximate user search requests. To expedite such selections, a server may index descriptions, manufacturers, product classes, product names, and other frequently searched fields.

When appropriate records are selected, a server may transmit such records to client software for display. Client software may present such records in a variety of formats, including, but not limited to, a columnar or tabular format. Table 2 lists sample column names, sample source table names, source field names, and additional functionality client software may present when displaying such records.

TABLE 2

| Column Heading | Source Table | Source Field |
| --- | --- | --- |
| Description | PRODUCTS | SHORT_DESCRIPTION |
| Product ID | PRODUCTS | PRODUCT_ID |
| Manufacturer | PRODUCTS | MANUFACTURER |
| Mfg Item No. | PRODUCTS | MANUFACTURER_ITEM_NUMBER |
| Prod. Type | PRODUCTS | PRODUCT_TYPE |
| Prod. Class | PRODUCTIONS | PRODUCT_CLASS |
| Check Availability | None | Window action field |
| Add to Stock Plan | None | Window action field |

As Table 2 indicates, client software can allow a customer to check product availability and add products to a stock plan. In a preferred embodiment, client software may make such functionality available for each record displayed. In an alternative embodiment, records may have check boxes or other selection controls, thereby allowing customers to check the availability of multiple items, and add multiple items to a stock plan.

When a customer checks availability of a product or products, the present invention may search Linked Supplier inventories to determine quantities available, physical location, anticipated delivery times, and the like. When inventory is available, client software may allow a customer to order a product.

When a customer chooses to add a product to an inventory or stocking plan, client software may request restocking and other parameters from a customer, then send appropriate information to a server. A server may add an appropriate entry to a Customer_Inventory or other similar table, thereby enabling inventory tracking through the present invention.

Client software can also allow a customer to request a telephone call, an E-mail, or other contact from a sales consultant. In a preferred embodiment, a customer may select a product or supplier, and client software can query a server to determine an appropriate sales consultant for the selected product or supplier. A user can then be presented with a dialog box or other interactive interface which asks a customer to confirm a contact request. Once a contact request has been confirmed, client software may cause a server to store a request message in a Contact_Log table or other similar table.

In a preferred embodiment, a server may periodically scan Contact Log_table entries. When new or unanswered requests are found, a server may send a notification to a supplier alerting said supplier of such a request, where such a notification can include a customer E-mail address, telephone number, fax number, or other contact information, as well as other relevant customer and product information.

While the present invention can monitor inventory use and automatically order new inventory when necessary, a customer may anticipate a need for additional inventory based on parameters outside the scope of the present invention. By way of example, without intending to limit the present invention, if the present invention is used in a hospital, and the Olympics was held in or near the city in which the hospital is located, a hospital administrator may foresee the need to order additional quantities of frequently used supplies. Client software can provide a customer with the ability to quickly place such orders.

Customers can initiate such an order by clicking a button or otherwise interacting with a graphical or physical interface. In a preferred embodiment, a customer may select from products or groups of products already included in an inventory or stocking plan, or a customer may search for products through an interface similar to that described earlier. As previously described, customers can designate standard restocking quantities, and client software may use such quantities as defaults when clients are requesting additional inventory. Client software may also present quantities on hand to help customers make smarter purchasing decisions. Based on such information, customers can modify order quantities before submitting an order.

Client software can transmit customer orders to a server. Upon receipt of a customer order, a server can initiate an order fulfillment process.

A server may also automatically place an order based on customer demand. A server may periodically scan a customer inventory table and monitor inventory usage. As inventory is depleted, a server can predict frequently used items, and order appropriate quantities. Initially, a server may order limited quantities, to limit customer costs. A server may increase order quantities for frequently ordered products as customer usage habits dictate. A server may also construct an historical usage characterization, so that seasonal or other periodic usage patterns can be automatically taken into account.

As orders are placed, a server can query Linked Supplier inventories to determine each supplier's ability to fulfill an order. A server can calculate shipping costs as each order is processed, and a server can select one or more suppliers who can most cost effectively meet customer needs. As qualified suppliers are identified, orders are placed which can include expedited delivery and other options as specified by a customer or as determined by a server.

A server can also post supplier invoices to an accounts payable system, generate customer invoices based on supplier invoices, post customer invoices to an accounts receivable system. A server may further integrate with an automated payment system, thereby limiting invoicing and other such expenses.

In addition to customer and order related functions, a server can also provide administrative functions. By way of example, without intending to limit the present invention, a user who is not a customer can register to be a customer through a server-provided interface. Such an interface may allow a user to specify a business name, business type, executive director or general manager, physical address, mailing address, shipping address, one or more telephone numbers, employee names, employee licensing and accreditation information, and the like.

As users submit such information, a server may validate that an address, telephone number, and zip code are all valid with respect to each other, and that all necessary fields have been filled. If any validations fail, a server may present a data entry page along with any invalid data, thus simplifying data correction.

A server and client software may also allow customers and suppliers to change various information. By way of example, without intending to limit the present invention, suppliers can change pricing; add or remove vendors and products; add, edit, or remove contacts; view account status and open invoices; and perform other such functions. Customers can adjust inventory counts to reflect audit results; add, edit, or remove employees and employee information; update payment and contact information; view account balances and make payments; and perform other such functions.

Linked Suppliers can also take advantage of many of these same features. Linked Suppliers implementing the present invention can track inventory; provide real-time inventory information to prospective customers; accept electronic orders; generate pick/pack lists; track order fulfillment process, including tracking into which containers each item in an order has been placed; generate bar-coded packing lists and shipping labels for each container; and generate invoices.

The present invention also provides Linked Suppliers with other advantages over the prior art. By way of example, without intending to limit the present invention, Linked Supplier inventory needs can be forecast based on prior order history, prior lead times, safety stock quantities, and the like, thereby reducing overall inventory investment. The present invention can also allow enable a Linked Supplier to track processing and shipping status for various products within an order, thereby providing a higher level of customer service. The present invention may also allow managers or other authorized individuals to electronically sign a purchase order, invoice, or other billing or order document and electronically transmit such a document to an appropriate recipient.

To achieve the functionality set forth above, a preferred embodiment of the present invention includes the following table structure. The table structure described below is included for enablement and best mode purposes, and should not be construed as limiting the present invention.

Table Name—
CLIENT_CONTROL

Table Description and function—This table can reside locally on a customer computer. It can store one or more records containing control data needed to manage on and off-line functions remotely. These records can be updated via an update applet transferring data from the Web Server's SQL database to this control. Its purpose is to provide control over the processes running on the local machine even if it is off-line, and to enable it to reconnect automatically.

| Column (field) Name | Description |
| --- | --- |
| CUSTOMER_ID | Customer ID - matches Customer ID in CUSTOMERS data in the Web Server SQL Database |
| IP_ADDRESS | This is the IP address for this machine |
| DSL_PORT | Connection path or port (e.g., COM2) where DSL connection exists; null if there is no DSL line for this machine |

-continued

| Column (field) Name | Description |
| --- | --- |
| DIAL_PORT | Connection path ro port (e.g., COM3) where dial-up connection exists; null if there is no dial-up connection for this machine |
| DIAL_CONNECTION_PHONE | Phone number the software dials to establish a dial-up connection to the Web server system. Null if there is no dial-up connection |
| DIAL_CALL_BACK | Phone number of the dial-up line; to allow call-back from the web server. |

Table Name—CLIENT_ERROR_LOG

Table Description and function—This table contains an error generation history for processes originating on a customer machine. It can provide an audit trail and view of how well processes are functioning, and a place to record both fatal-error conditions and those that may not need to be displayed to customers. Its data may not be processed, but can be stored for review by system administrators and managers.

| Column (field) Name | Description | Field Characteristics & Indexing |
| --- | --- | --- |
| ERROR_DATE | Date of error log entry | Index - concatenated with ERROR_TIME |
| ERROR_TIME | Time of error log entry | Index - with ERROR_DATE |
| CALLER | Program name generating the error log entry | |
| ERROR_MESSAGE | Error message generated by the caller program | |
| USER_VIEWABLE | Yes - if message also displayed on user seen page; No if internal only message | |
| DATA_DUMP | Data (if any) causing the error | |

Table Name—SYSTEM_ERROR_LOG

Table Description and function—This table can contain a history of errors generated by processes originating from outside a customer machine. The table can provide an audit trail and view of how well processes are functioning, and provide a place to record both fatal and non-fatal errors. Such data can allow system administrators, programmers, and managers to monitor automated, unattended processes. SYSTEM_ERROR_LOG can use a data dictionary/field structure similar to a Client_Error_Log table.

| Column (field) Name | Description | Field Characteristics & Indexing |
| --- | --- | --- |
| ERROR_DATE | Date of error log entry | Index - concatenated with ERROR_TIME |
| ERROR_TIME | Time of error log entry | Index - with ERROR_DATE |
| CALLER | Program name generating the error log entry | |
| ERROR_MESSAGE | Error message generated by the caller program | |
| USER_VIEWABLE | Yes - if message also displayed on user seen page; No if internal only message | |
| DATA_DUMP | Data (if any) causing the error | |

Table Name—SYS_PARAMETERS

Table Description and function—Stores system-wide parameters in a common table.

| Column (field) Name | Description | Field Characteristics & Indexing |
|---|---|---|
| PARAM_ID | Identifies parameter | Primary Index |
| VAR1 | First variable | |
| VAR2 | Second variable | |
| VAR3 | Third variable | |

Table Name—
CUSTOMER_APPLICATION

Table Description and function—this table can have a data dictionary similar to the CUSTOMERS table, and can be used to temporarily store unapproved, unprocessed customer application data submitted by a Customer/Client Application page. When an application is processed, appropriate records can be deleted from this table.

| Column (field) Name | Description | Field Characteristics & Indexing |
|---|---|---|
| See CUSTOMERS | | |

Table Name—
MEMBERS_APPLICATION

Table Description and function—this table has may use a data dictionary similar to PRACTICE_MEMBERS, and can temporarily store unapproved, unprocessed customer application data submitted by a Customer/Client Application page. When an application is processed, appropriate records can be deleted from this table.

| Column (field) Name | Description | Field Characteristics & Indexing |
|---|---|---|
| See PRACTICE_MEMBERS | | |

Table Name—
CUSTOMERS

Table Description and function—Can store a unique identifier for each customer in a permanent table. Activity logged in CUSTOMER MAINT_HISTORY table. Can be linked to third-party applications for credit terms, bill to, ship to addresses, phones and other financial data.

| Column (field) Name | Description | Comment | Field Characteristics & Indexing |
|---|---|---|---|
| CUSTOMER | Identifies customer | Unique identifier (account number); matches CUSTOMER in A/R system | Primary Index |
| NAME | Practice Business Name | See Practice Members for doctor data. | Index |
| SALES_CONSULTANT | Identifies sales consultant | | Index |

-continued

| Column (field) Name | Description | Comment | Field Characteristics & Indexing |
|---|---|---|---|
| | assigned to account | | |
| IPADDRESS1 | Internet address used to link, identify computers in customers office | Can have multiple computers in larger offices. | |
| IPADDRESS2 | Internet address used to link, identify computers in customers office | Can have multiple computers in larger offices. | |
| IPADDRESS3 | Internet address used to link, identify computers in customers office | Can have multiple computers in larger offices. | |
| IPADDRESS4 | Internet address used to link, identify computers in customers office | Can have multiple computers in larger offices. | |
| DISCOUNT_CODE | Identifies which discount code is used to calculate prices charged for this customer | Code must be in DISCOUNT_CODES table. | Index |
| PHYSICAL_ADDRESS | Street address of practice | | |
| PHYSICAL_STATE | State in which the practice is located | | |
| PHYSICAL_ZIP | Zip code of physical location of practice | | |
| SHIP_TO_ADDRESS | Address to which shipments go | | |
| SHIP_TO_STATE | State for ship to address | | |
| SHIP_TO_ZIP | Zip code for ship to address | | |
| MAIL_ADDRESS | Mailing address (for other than shipments) | Literature, documents only (may be a PO Box to which UPS & FedEx cannot ship) | |
| MAIL_STATE | Mail address state | | |
| MAIL_ZIP | Zip code for mail address | | |
| ADMINISTRATOR | Administrator, manager, etc. of Customer | | |

50

Table Name—
PRACTICE_MEMBERS
Table Description and function—This table can be linked to records in a CUSTOMERS table, and can store data pertaining to individual physicians or other health-care professionals working at or with a practice.

| Column (field) Name | Description | Comment | Field Characteristics & Indexing |
|---|---|---|---|
| CUSTOMER | Customer to whom the Practice Member is associated | Must be in CUSTOMERS table already MEMBER_NAME | Index - concatenated with |
| MEMBER_NAME | Name of health-care professional | Together with CUSTOMER, forms | With CUSTOMER |

-continued

| Column (field) Name | Description | Comment | Field Characteristics & Indexing |
|---|---|---|---|
| | or physician linked to CUSTOMER | unique record key | |
| MEMBER_TITLE | Title (e.g., Exec. Director) of member | | |
| MEMBER_MAIL_ADDRESS | Separate mailing address for member | | |
| MEMBER_MAIL_STATE | Member mail address state | | |
| MEMBER_MAIL_ZIP | Member mail address zip | | |
| MEMBER_LICENSE_NO | Professional license for member | | |
| MEMBER_LICENSE_EXPIRE | Expiration Date of member's professional license | | |
| MEMBER_DEGREE1 | First degree of member | | |
| MEMBER_DEGREE2 | Second degree of member | | |
| MEMBER_DEGREE3 | Third degree of member | | |
| MEMBER_DEGREE4 | Fourth degree of member | | |
| MEMBER_NOTES | Text/comment field | | |
| DATE_NEW | Date this member was added to table | | |
| DATE_LAST | Last activity date | | |

Table Name—
DISCOUNT_CODES

Table Description and function—can contain decimal values representing a unique price to be charged or discount to be granted to each customer. Any number of customers may use a discount code. When a decimal value associated with a given code is changed, the result is that all prices for all customers using that code are changed. If a customer's discount code specifies a discount value greater than allowed for a given product, the present invention may limit a price to the maximum discount.

Table Name—
CUSTOMER_INVENTORY

Table Description and function—stores inventory at customer office. One record for each customer/SKU combination, including all that have been used in past, or which are to be used for next ordering cycle. Permanent table. Activity logged in CUSTOMER_INVENTORY_TX table.

| Column (field) Name | Description | Comment | Field Characteristics & Indexing |
|---|---|---|---|
| DISC_CODE | Discount code | Identifies specific discount; numbering should be 10,20,30, etc. to allow for insertions in future, e.g, 14 | Primary Index |
| DISC_VALUE | Decimal value for the discount to be given | | |
| NOTES | Notes; text field for commentary about a particular discount code | | |

| Column (field) Name | Description | Comment | Field Characteristics & Indexing |
|---|---|---|---|
| CUSTOMER | Identifies customer | | Index - concatenated with PRODUCT |
| PRODUCT | Identifies product at customer's site | | Indexed with CUSTOMER |
| ON_HAND_QTY | Quantity of an item on hand at this customer | | |
| ROP | Reorder point quantity | When on_hand_qty falls to or below this quantity, a new order is triggered for the product. | |
| ROQ | Quantity to be ordered | Ordering process uses this quantity when a product is "triggered" | |
| STATUS | Activity status of item | Values: Active (default, normal setting) NoOrder (continue to use up inventory, but no more orders) NoUse (do not accept scanned usage of product) | Index |

Table Name—
PRODUCTS                                                    30

Table Description and function—identifies products available for sale at any point in time. Includes products no longer active. One record for each product/SKU/Item Number.

| Column (field) Name | Description | Comment | Field Characteristics & Indexing |
|---|---|---|---|
| PRODUCT_ID | Identifies product; SKU; also is "item number" | | Primary Index |
| SHORT_DESCRIPTION | Short description appearing on most printed outputs & screens | | Index |
| LONG_DESCRIPION | Long description for additional description | | Index, built so each word is indexed separately. |
| MANUFACTURER | Company making product; Must be in MANUFACTURERS table | | Index |
| MANUFACTURER_ITEM_NUMBER | Manufacturer's product identifier | | Index |
| STATUS | Item status | Values: Active (default, normal usage) NoOrder (accept usage scans, no orders) NoUse (do not accept usage scans; no activity; obsolete or discontinued) | |
| PRODUCT_CLASS | Marketing/sales classification of product | | Index |
| PRODUCT_GROUP | Commodity classification of product | | Index |

-continued

| Column (field) Name | Description | Comment | Field Characteristics & Indexing |
|---|---|---|---|
| PRODUCT_LINE | Financial reporting classification of product | | Index |
| SELL_START_DATE | Date that new orders for this product can be processed | Prior to this date orders will not be processed (new product so not available yet) | |
| SELL_END_DATE | Date after which new orders for this product cannot be processed | After or on this date, orders will not be processed (discontinued product) | |
| PRODUCT_PICTURE | Product Picture bit map image | JPEG or GIF | |

Table Name—

MANUFACTURERS

Table Description and function—This table stores all manufacturers whose products may be carried in the PRODUCTS table. It serves as a reference and validation table for products.

| Column (field) Name | Description | Comment | Field Characteristics & Indexing |
|---|---|---|---|
| MANUFACTURER_ID | Short abbreviation for manufacturer | | Primary Index |
| MANUFACTURER_NAME | Normal business name for manufacturer | | Indexed |

-continued

| Column (field) Name | Description | Comment | Field Characteristics & Indexing |
|---|---|---|---|
| DATE_ADDED | Date this Manufacturer was added to the table | | |

Table Name—

ORDERS

Table Description and function—stores orders generated by nightly process and/or by critical ordering process, which are then downloaded to distributor. Serves as order "header" record. Linked to ORDER_DETAIL table where line items are stored. No maintenance history log table. One record for each order generated and downloaded.

| Column (field) Name | Description | Comment | Field Characteristics & Indexing |
|---|---|---|---|
| ORDER_NO | Order Number; unique identifier for the order | Generated by ordering processes; increments SYSTEM_PARAMTER for order number | Primary Index |
| ORDER_DATE | Date order generated | | Index |
| ORDER_TIME | Time order generated | | |
| ORDER_SOURCE | How order was generated | Sources are: AUTO - nightly process MANUAL - manual order entered on terminal in customer's office. | |
| CUSTOMER | Customer on the order | | Index |
| LINKED_SUPPLIER | Linked Supplier to whom the order was downloaded | | Index |
| ORDER_STATUS | Status of the order; shows latest status only, sequence is presumed | Values: GEN - generated PLACED - downloaded to supplier | Index |

-continued

| Column (field) Name | Description | Comment | Field Characteristics & Indexing |
|---|---|---|---|
| | | S_BILLED - supplier has invoiced Med-e-Track C_BILLED- system has converted supplier invoice to customer invoices | |
| STATUS_DATE | Date which status changed | | |
| SHIP_TO_ADDRESS | Address to which orders is to be shipped; appears on downloaded order data | | |
| ORDER_PRODUCT_TOTAL | Total value of order for product only; not including tax, shipping, other charges | | |

Table Name—
ORDER_DETAIL

Table Description and function—stores line item detail on ORDERS. One record for each line item on an order.

| Column (field) Name | Description | Comment | Field Characteristics & Indexing |
|---|---|---|---|
| ORDER_DTL_ORDER_NO | Order number to which this detail record belongs | | Index - concatenated with ORDER_LINE_NUMBER |
| ORDER_LINE_NUMBER | Line number for order. | With Order_Dtl_Order_no, forms a unique identifier | |
| PRODUCT | Product identifier for item ordered | | Index |
| ORDER_QUANTITY | Quantity of the product that is being ordered. | | |
| SHIP_QUANTITY | Quantity of the item shipped; as reflected on an uploaded, processed supplier invoice/packlist | | |
| CUSTOMER_UNIT_PRICE | Price to be charged to customer | | |
| CUSTOMER_UNI_SALES_TAX | Sales tax, if any to be charged customer | | |
| PRODUCT_ORDERED_SUBTOTAL | Value = Order_Quantity * Customer_Unit_price | | |
| PRODUCT_SHIP_SUBTOTAL | Value = Ship_Quantity * Customer Unit_Price | | |
| LINKED_SUPPLIER_UNIT_COST | Price to be paid Linked Supplier for this item | | |

-continued

| Column (field) Name | Description | Comment | Field Characteristics & Indexing |
|---|---|---|---|
| LINKED_SUPPLIER_PRODUCT_SHIP_SUBTOTAL | Value = Ship Quantity * Linked_Supplier_Unit_cost | | |

Table Name—
LINKED _SUPPLIER

Table Description and function—Stores and sets up each linked supplier, i.e., distributor that is linked into the web site. One record for each supplier that will be, is now, or has been linked at one time into Med-e-Track. Activity logged in LINKED_SUPPLIER MAINT_HISTORY. Account is linked to Supplier table in the SOLOMAN Accounts Payable subsystem.

| Colunm (field) Name | Description | Comment |
|---|---|---|
| SUPPLIER | Supplier's ID | Unique identifier |
| SUPPLIER_IP_ADDRESS | IP Address where linking process occurs | |
| OPEN_DATE | Date the relationship was setup/started | |

Table Name—INVOICE SUPPLIER _

Table Description and function—stores uploaded invoice/pack lists from linked suppliers. Serves as "header" record for invoices. A given Order can have multiple invoices. Linked to SUPPLIER_INVOICE_DETAIL records which carry line item detail. Invoices uploaded from distributor reflect orders they have shipped and are then used to generate Customer invoices. The uploaded invoice data is also transferred to the Accounts Payable module of the Solomon IV software for corporate accounting/tracking. Customer invoices generated and recorded in this table are also transferred to the Accounts Receivable module.

| Column (field) Name | Description | Comment | Field Characteristics & Indexing |
|---|---|---|---|
| INTERNAL_INVOICE_ID | Internal, system generated invoice identifier | Insures unique invoice identification in case of similar supplier invoicing schemes/numbers | |
| ORDER | Order number which the invoice is a shipment/bill for. | | |
| SUPPLIER_INVOICE | Invoice identifier from supplier | Uploaded invoice data | |
| SUPPLIER_INVOICE_DATE | Date of/on supplier invoice that was uploaded | | |
| SUPPLIER_INVOICE_TIME | Time that supplier invoice was uploaded | Invoice time may not appear in supplier database. | |
| AP_DATE | Date supplier invoice data posted to AP tables | | |
| AP_TIME | Time supplier invoice data was posted to AP tables | | |
| CUSTOMER_INVOICE | Invoice ID generated by nightly process to bill customer for shipment | Presence indicates that nightly process has run, generating this separate invoice number. | |
| CUSTOMER_INVOICE_DATE | Date customer invoice generated by nightly process | | |
| CUSTOMER_INVOICE_TIME | Time of customer invoice generation process. | | |
| AR_DATE | Time | | |

-continued

| Column (field) Name | Description | Comment | Field Characteristics & Indexing |
|---|---|---|---|
| SHIPMENT | Shipment document number | May be separate ID from invoice no. | Index on this field for packing slip data retrieval. |
| SHIP_VIA | Shipping method; e.g., UPS Ground | | |

Table Name—
INTERNAL_INVOICE_SHIP_DETAIL

Table Description and function—This table contains shipment information for the shipment covered by the Internal Invoice. There is one record for each carton comprising the shipment covered by the Invoice. It is linked to the Internal_Invoice table.

| Column (field) Name | Comment |
|---|---|
| INTERNAL_INVOICE_ID | |
| SHIP_CARTON_ID | Together with invoice id, comprises unique record ID |
| TRACKER_NO | |

Table Name—
SUPPLIER_INVOICE_DETAIL

Table Description and function—this table carries the line item level detail for invoices uploaded from the linked supplier/distributor. Some line item level detail is used to update Order data to support quick order status inquiries and track back-ordered items.

| Column (field) Name | Description | Comment |
|---|---|---|
| INTERNAL_INVOICE_ID | Identifier for internal invoice no | |
| INTERNAL_INVOICE_LINE_NUMBER | Line number for internal invoice | Together with Internal Invoice identifier, forms unique key |
| SHIPPED_PRODUCT | Product shipped | |
| SHIP_QUANTITY | Quantity shipped | |
| UNIT_PRICE | Supplier's Unit price | |
| UNIT_TAX | Sales Tax (if any) | |
| EXTENDED_PRICE | Value = Ship_qty * Unit_Price | Product only subtotal |
| LINE_TAX_TOTAL | Value = Ship_Qty * Unit_Tax | |
| LINE_TOTAL_AMOUNT | EXTENDED_PRICE + Line_Tax_total | |

Table Name—
SUPPLIER_COST

Table Description and function—Stores prices to be paid to each Linked Supplier in the system. One record for each linked supplier and SKU. Permanent table. Activity logged in SUPPLIER_COST_MAINT_HISTORY table.

| Column (field) Name | Description | Comment | Field Characteristics & Indexing |
|---|---|---|---|

Table Name—
SUPPLIER_COST_MAINT_HISTORY

Table Description and function—records changes made to SUPPLIER_COST records. One record for each field changed during an update of a given record.

| Colunm (field) Name | Description | Comment | Field Characteristics & Indexing |
|---|---|---|---|

Table Name—
PRODUCT_MAINT_HISTORY

Table Description and function—records changes made to PRODUCTS table. One record for each field changed during an update of a given record.

| Colunm (field) Name | Description | Comment | Field Characteristics & Indexing |
|---|---|---|---|

Table Name—
PRODUCT_CLASS

Table Description and function—Identifies valid product classes; serves as a reference table.

| Column (field) Name | Description |
|---|---|
| PROD_CLASS_CODE | Code for product class description |
| DESCRIPTION | Text/descriptive name for product_class code |

Table Name—
PRODUCT_GROUP

Table Description and function—Identifies valid product groups; serves as a reference table.

| Column (field) Name | Description |
| --- | --- |
| PRODUCT_GROUP_CODE | Code for product group description |
| DESCRIPTION | Text/descriptive name for Product Group Code. |

Table Name—
PRODUCT_LINE
Table Description and function—Identifies valid product lines; serves as a reference table.

| Column (field) Name | Description |
| --- | --- |
| PRODUCT_LINE_CODE | Code for product line description |
| DESCRIPION | Text/descriptive name for product line code |

Table Name—
CUSTOMER_INVENTORY_TRANSACTIONS
Table Description and function—transaction history table for activity altering data in Customer_Inventory table; one record for each change recorded; main use will be recording inventory activity, although transactions will be generated for changes to status, ROP, ROQ and Notes values, i.e., non-on-hand quantity values. Each transaction affects only one data field. Transaction code indicates what update/change activity was performed, and therefore which data field was updated.

| Column (field) Name | Description | Comment |
| --- | --- | --- |
| TRAN_NO | Unique identifier for each transaction; non significant | Functions like a check number. |
| TRAN_DATE | Date transaction processed | |
| TRAN_TIME | Time transaction processed | |
| TRAN_ID | Code identifying transaction | Values: TBD |
| PRODUCT | Product identifier of item affected | |
| QTY | | |
| CUSTOMER | Customer whose inventory data was updated/changed | |
| USER_ID | User performing transaction | |
| BEFORE_VALUE | Value of data field prior to update action. | |
| AFTER_VALUE | Value of data field after update action | |

Table Name—
CONTACT_LOG
Table Description and function—this table accepts transactions from the consultant request function, enters and tracks them for followup and management purposes.

| Column (field) Name | Description |
| --- | --- |
| SALES_CONSULTANT_ID | ID in Sales_Consultants table. |
| REQUEST_DATE | Date customer initiated request |
| REQUEST_TIME | Time customer initiated request |

Table Name—
CUSTOMER_USERS
Table Description and function—This table stores information about each user at a customer's site. There are two classes of users, supervisor and staff. Only a user with supervisor rights can add new users. The web page "hardwires" who the customer is so customer users are kept associated with the correct customer.

| Colunm (field) Name | Description | Comment | Field Characteristics & Indexing |
| --- | --- | --- | --- |

Table Name—SALES_CONSULTANTS
Table Description and function—This table stores data about each Sales Consultant. It is essentialy a reference table.

| Column (field) Name | Description |
| --- | --- |
| SALES_CONSULTANT_ID | Unique identifier * record key |
| CONSULANT_SHORT_NAME | Short name, nicknemame, initials to be used on screens, reports |
| CONSULTANT_FULL_FIRST_NAME | First name of consultant |
| CONSULTANT_LAST_NAME | Last name of consultant |

It should be obvious to one skilled in the art that the present invention allows inventory tracking and management through a combination of manual, semi-automated, and automated means. The present invention also allows a manager to purchase in bulk and take advantage of promotions and other special offerings, thus reducing inventory costs. In addition, the present invention reduces the amount of inventory which must be kept on-hand by accurately modeling and predicting inventory needs. The present invention further provides customers with the ability to review new equipment, communicate with each other, and buy and sell excess inventory, refurbished equipment, and the like.

While the preferred embodiment and various alternative embodiments of the present invention have been disclosed and described in detail herein, it may be apparent to those skilled in the art that various changes in form and detail may be made therein without departing from the spirit and scope thereof, including applying the present invention to fields other than healthcare.

What is claimed is:

1. An inventory management system, comprising the following elements, operably connected:
   (a) at least one computer having at least one storage medium;
   (b) one or more databases residing on said at least one storage medium, in which at least the following data is stored:
   (1) customer inventory information,
   (2) inventory and cost information for a plurality of manufacturers, suppliers, or distributors
   (3) inventory restocking parameters provided by said customer; and
   (c) client software residing on said at least one storage medium providing an interface to said one or more database(s), wherein the client software identifies users and allows users to be classified into groups, and wherein permissions or roles are assigned to such groups, and wherein:
   (i) said software evaluates said customer inventory information and iventory or cost information for a plurality of manufacturers, suppliers, or distributors in light of said restocking parameters provided by said customer, (ii) said software automatically orders manufacturer, supplier, or distributor inventory which best fulfills said inventory restocking parameters provided by said customer in light of said evaluation, (iii) said software tracks inventory items in said databases for (1) said customer and (2) said manufacturer, supplier, or distributor, as inventory items are added to, restocked to, or removed from said inventories, wherein said tracking is executed by detecting an RFID tag associated with each said inventory item, (iv) said software updates said data on said one or more databases through at least one software interface to said databases; and (v) said software provides an interface through which said customer, manufacturer, supplier, or distributor can access the information in said one or more databases according to said assigned permissions or roles.

2. The inventory management system of claim 1, wherein said client software additionally forecasts the inventory needs of said customer, manufacturer, supplier, or distributor based on inventory usage, or inventory availability trends, or both, wherein said evaluation of customer inventory information and manufacturer, supplier, or distributor inventory and cost information is executed in light of said restocking parameters provided by said customer and said forecast inventory needs.

3. The inventory management system of claim 1, wherein said client software monitors inventory levels and reports anticipated shortages.

4. The inventory management system of claim 1, wherein said client software monitors inventory levels and generates orders to cover anticipated shortages.

5. The inventory management system of claim 1, wherein said client software allows users to order new inventory items or to supplement inventory when desired.

6. The inventory management system of claim 1, wherein said customer inventory information is collected and stored for multiple customer business sites or for multiple customers, and wherein inventory restocking parameters provided by said customer are collected and stored for each said customer.

7. The inventory management system of claim 1, wherein said inventory and cost information is collected and stored for multiple manufacturers, suppliers, or distributors.

8. The inventory management system of claim 1, wherein said step of updating takes place in real time.

9. The inventory management system of claim 1, wherein said detecting of an RFID tag associated with each said inventory item is executed by one or more REID readers.

10. The inventory management system of claim 1, wherein said REID tag is read by a hand held electronic device.

11. The inventory management system of claim 1, wherein said RFID tag is read by an electronic portal device.

12. The inventory management system of claim 1, wherein said client software permits registration and removal of individual users, and modification of user information.

13. The inventory management system of claim 1, wherein said client software allows inventory items to be grouped, allows restrictions to be placed on distribution of such inventory items, permits recording of information when an inventory item belonging to a group is dispensed, and allows printing of inventory item specific information for inclusion with each inventory item removed from inventory.

14. The inventory management system of claim 1, wherein said client software allows users to specify a price for goods for sale within an inventory.

15. The inventory management system of claim 1, wherein a user of the computer program is identified via an optical reader which can read specially coded information on a person.

16. The inventory management system of claim 1, wherein a user of the computer program is identified via an electronic device for scanning wirelessly accessible identifiers associated with a person.

17. The inventory management system of claim 1, wherein a user of the computer program is identified via a biometric identification device.

18. The inventory management system of claim 1, wherein said client software provides an interface through which inventory item identity information can be entered in an automated manner.

19. A method for inventory management, comprising the steps of:

(a) collecting and storing, on one or more databases having client software, at least the following data:

(1) customer inventory information (2) inventory and cost information for a plurality of manufacturers, suppliers, or distributors, and (3) inventory restocking parameters provided by said customer;

(b) evaluating via at least one computer said customer inventory information and inventory or cost information for a plurality of manufacturers, suppliers, or distributors inventory or cost information for a plurality of users selected from the group consisting of customers, manufacturers, suppliers, and distributors in light of said restocking parameters provided by said customer;

(c) ordering manufacturer, supplier, or distributor inventory which best fulfills said inventory restocking parameters provided by said customer;

(d) tracking inventory items in said databases for (1) said customer and (2) said manufacturer, supplier, or distributor, as inventory items are added to, restocked to, or removed from said inventories, wherein said tracking step is executed by detecting an RFID tag associated with each said inventory item;

(e) updating said data on said one or more databases, using information obtained in said inventory tracking step, through at least one software interface to said databases; and (f) providing access via client software to information in said one or more databases to each said customer, manufacturer, supplier, or distributor, wherein said client software allows one or more customers, manufacturers, suppliers, or distributors to be classified into groups, and where permissions or roles are assigned to such groups.

20. The method of claim 19, comprising the additional step of forecasting the inventory needs of customers, manufacturers, suppliers, or distributors based on inventory usage or inventory availability trends, wherein said step of evaluating said customer inventory information and said manufacturer, supplier, or distributor inventory and cost information is executed in light of said restocking parameters provided by said customer and said forecast inventory needs.

21. The method of claim 19, wherein said step of ordering is completed automatically based upon the evaluation of said customer inventory information and said manufacturer, supplier, or distributor inventory and cost information, in light of said restocking parameters provided by said customer.

22. The method of claim 19, wherein said method comprises the additional step of forecasting inventory usage or inventory availability for each said customer, manufacturer, supplier, and distributor, based upon said customer, manufacturer, supplier, or distributor information.

23. The method of claim 19, wherein said client software monitors inventory levels and reports anticipated shortages.

24. The method of claim 19, wherein said client software monitors inventory levels and generates orders to cover anticipated shortages.

25. The method of claim 19, wherein said client software allows users to order Previously presented inventory items or to supplement inventory when desired.

26. The method of claim 19, wherein said customer inventory information is collected and stored for multiple customer business sites or for multiple customers, and wherein inventory restocking parameters provided by said customer are collected and stored for each said customer.

27. The method of claim 19, wherein said inventory and cost information is collected and stored for multiple manufacturers, suppliers, or distributors.

28. The method of claim 19, wherein said step of updating takes place in real time.

29. The method of claim 19, wherein said RFID tag is read by a hand held electronic device.

30. The method of claim 19, wherein said RFID tag is read by an electronic portal device.

31. The method of claim 19, comprising the additional step of providing a software interface through which inventory item identity information can be entered in an automated manner.

32. A computer program product for managing customer inventory, comprising program instructions stored on at least one computer readable storage medium which when executed causes a computer to:

(a) access from one or more databases, at least the following stored data:
(1) customer inventory information,
(2) inventory and cost information for a plurality of manufacturers, suppliers, or distributors, and
(3) inventory restocking parameters provided by said customer;

(b) evaluate said customer inventory information and inventory or cost information for a plurality of manufacturers, suppliers, or distributors in light of said restocking parameters provided by said customer;

(c) order manufacturer, supplier, or distributor inventory which best fulfills said inventory restocking parameters provided by each said customer;

(d) track inventory items for (1) each customer and (2) each manufacturer, supplier, or distributor, as inventory items are added to, restocked to, or removed from inventory,
wherein said tracking step is executed by detecting an RFID tag associated with each said inventory item and by updating said databases through at least one software interface to said databases;

(e) update said data on said one or more databases; and (f) provide access to the information in said one or more databases to said customer, manufacturer, supplier, or distributor,
wherein said computer program product allows customers, manufacturers, suppliers, or distributors to be classified into groups, and where permissions or roles are assigned to such groups.

33. The computer program product of claim 32, further comprising program instructions for allowing the forecasting of inventory needs of said customer, manufacturer supplier, or distributor based on inventory usage or inventory availability trends,
wherein said evaluation of customer inventory information and manufacturer, supplier, or distributor inventory and cost information is executed in light of said restocking parameters provided by said customer and said forecast inventory needs.

34. The computer program product of claim 32, further comprising program instructions for:
(1) monitoring inventory levels; and
(2) reporting anticipated shortages.

35. The computer program product of claim 32, further comprising program instructions for:
(1) monitoring inventory levels; and
(2) generating orders to cover anticipated shortages.

36. The computer program product of claim 32, further comprising program instructions for allowing users to order Previously presented inventory items or to supplement inventory when desired.

37. The computer program product of claim 32, further comprising program instructions wherein said step of ordering is completed automatically based upon the evaluation of said customer inventory information and said manufacturer, supplier, or distributor inventory and cost information in light of said restocking parameters provided by said customer.

38. The computer program product of claim 32, further comprising program instructions for allowing said step of updating to take place in real time.

39. The computer program product of claim 32, further comprising program instructions for permitting access to the information in said one or more databases, according to said assigned roles or permissions, to a user of the computer program identified via an optical reader which can read specially coded information on a person.

40. The computer program product of claim 32, further comprising program instructions for permitting access to the information in said one or more databases, according to said assigned roles or permissions, to a user of the computer program identified via an electronic device for scanning wirelessly accessible identifiers associated with a person.

41. The computer program product of claim 32, further comprising program instructions for permitting access to the information in said one or more databases, according to said assigned roles or permissions, to a user of the computer program identified via a biometric identification device.

42. The computer program product of claim 32, further comprising program instructions for enabling registration and removal of individual users of the computer program product and modification of user information.

43. The computer program product of claim 32, further comprising program instructions for performing administrative functions.

44. The computer program product of claim 32, further comprising program instructions for:

(1) allowing inventory items to be grouped into classifications;

(2) allowing restrictions to be placed on distribution of such inventory items;

(3) permitting recording of information when individual inventory items or inventory items belonging to a particular group or set of groups are added to, restocked to, or removed from inventory; and (4) allowing printing of inventory item specific or group specific labels or information to be included with each inventory item removed from inventory.

45. The computer program product of claim 32, further comprising program instructions for allowing users to specify a price for goods for sale within an inventory.

46. The computer program product of claim 32, further comprising program instructions for allowing detection of an RFID tag associated with each said inventory item to be executed by one or more RFID readers.

47. The computer program product of claim 32, further comprising program instructions for allowing said RFID tag to be read by a hand held electronic device.

48. The computer program product of claim 32, further comprising program instructions for allowing said RFID tag to be read by an electronic portal device.

49. The method of claim 19, comprising the additional step of identifying specially coded information on an object or a person via an optical reader.

50. The method of claim 19, comprising the additional step of identifying a wirelessly accessible identifier associated with an object or a person via an electronic device for scanning wirelessly accessible identifiers.

51. The method of claim 19, comprising the additional step of identifying a user of the computer program via a biometric identification device.

52. An inventory management system, comprising the following elements, operably connected:

(a) at least one computer having at least one storage medium;

(b) one or more databases residing on said at least one storage medium, in which at least the following data is stored:

(1) customer inventory information, (2) inventory and cost information for a plurality of manufacturers, suppliers, or distributors, and (3) inventory restocking parameters provided by said customer; and (c) client software residing on said at least one storage medium providing an interface to said one or more database(s), wherein the client software identifies users and allows users to be classified into groups, and wherein permissions or roles are assigned to such groups, and wherein:

(i) said software evaluates said customer inventory information and inventory or cost information for a plurality of manufacturers, suppliers, or distributors in light of said restocking parameters provided by said customer, (ii) said software automatically orders manufacturer, supplier, or distributor inventory which best fulfills said inventory restocking parameters provided by said customer in light of said evaluation, (iii) said software tracks inventory items in said databases for (1) said customer and (2) said manufacturer, supplier, or distributor, as inventory items are added to, restocked to, or removed from said inventories, (iv) said software updates said data on said one or more databases through at least one software interface to said databases; and (v) said software provides an interface through which said customer, manufacturer, supplier, or distributor can access the information in said one or more databases according to said assigned permissions or roles.

53. The inventory management system of claim 52, wherein said client software additionally forecasts the inventory needs of said customer, manufacturer, supplier, or distributor based on inventory usage, or inventory availability trends, or both, wherein said evaluation of customer inventory information and manufacturer, supplier, or distributor inventory and cost information is executed in light of said restocking parameters provided by said customer and said forecast inventory needs.

54. The inventory management system of claim 52, wherein said client software monitors inventory levels and reports anticipated shortages.

55. The inventory management system of claim 52, wherein said client software monitors inventory levels and generates orders to cover anticipated shortages.

56. The inventory management system of claim 52, wherein said client software allows users to order new inventory items or to supplement inventory when desired.

57. The inventory management system of claim 52, wherein said customer inventory information is collected and stored for multiple customer business sites or for multiple customers, and wherein inventory restocking parameters provided by said customer are collected and stored for each said customer.

58. The inventory management system of claim 52, wherein said inventory and cost information is collected and stored for multiple manufacturers, suppliers, or distributors.

59. The inventory management system of claim 52, wherein said step of updating takes place in real time.

60. The inventory management system of claim 52, wherein said client software permits registration and removal of individual users, and modification of user information.

61. The inventory management system of claim 52, wherein said client software allows inventory items to be grouped, allows restrictions to be placed on distribution of such inventory items, permits recording of information when an inventory item belonging to a group is dispensed, and allows printing of inventory item specific information for inclusion with each inventory item removed from inventory.

62. The inventory management system of claim 52, wherein said client software allows users to specify a price for goods for sale within an inventory.

63. The inventory management system of claim 52, wherein specially coded information on an object or a person is identified via an optical reader.

64. The inventory management system of claim 52, wherein a wirelessly accessible identifier associated with an object or a person is identified via an electronic device for scanning wirelessly accessible identifiers.

65. The inventory management system of claim 52, wherein a user of the computer program is identified via a biometric identification device.

66. The inventory management system of claim 52, wherein said client software provides an interface through which inventory item identity information can be entered in an automated manner.

67. A method for inventory management, comprising the steps of:
(a) collecting and storing, on one or more databases having client software, at least the following data:
(1) customer inventory information,
(2) inventory and cost information for a plurality of manufacturers, suppliers, or distributors, and
(3) inventory restocking parameters provided by said customer;
(b) evaluating via at least one computer said customer inventory information and inventory or cost information for a plurality of manufacturers, suppliers, or distributors in light of said restocking parameters provided by said customer;
(c) ordering manufacturer, supplier, or distributor inventory which best fulfills said inventory restocking parameters provided by said customer;
(d) tracking inventory items in said databases for (1) said customer and (2) said manufacturer, supplier, or distributor, as inventory items are added to, restocked to, or removed from said inventories;
(e) updating said data on said one or more databases, using information obtained in said inventory tracking step, through at least one software interface to said databases; and
(f) providing access via client software to information in said one or more databases to each said customer, manufacturer, supplier, or distributor,
wherein said client software allows one or more customers, manufacturers, suppliers, or distributors to be classified into groups, and where permissions or roles are assigned to such groups.

68. The method of claim 67, comprising the additional step of forecasting the inventory needs of customers, manufacturers, suppliers, or distributors based on inventory usage or inventory availability trends,
wherein said step of evaluating said customer inventory information and said manufacturer, supplier, or distributor inventory and cost information is executed in light of said restocking parameters provided by said customer and said forecast inventory needs.

69. The method of claim 67, wherein said step of ordering is completed automatically based upon the evaluation of said customer inventory information and said manufacturer, supplier, or distributor inventory and cost information, in light of said restocking parameters provided by said customer.

70. The method of claim 67, wherein said method comprises the additional step of forecasting inventory usage or inventory availability for each said customer, manufacturer, supplier, and distributor, based upon said customer, manufacturer, supplier, or distributor information.

71. The method of claim 67, wherein said client software monitors inventory levels and reports anticipated shortages.

72. The method of claim 67, wherein said client software monitors inventory levels and generates orders to cover anticipated shortages.

73. The method of claim 67, wherein said client software allows users to order new inventory items or to supplement inventory when desired.

74. The method of claim 67, wherein said customer inventory information is collected and stored for multiple customer business sites or for multiple customers, and wherein inventory restocking parameters provided by said customer are collected and stored for each said customer.

75. The method of claim 67, wherein said inventory and cost information is collected and stored for multiple manufacturers, suppliers, or distributors.

76. The method of claim 67, wherein said step updating takes place in real time.

77. The method of claim 67, comprising the additional step of providing a software interface through which inventory item identity information can be entered in an automated manner.

78. The method of claim 67, comprising the additional step of identifying specially coded information on an object or a person via an optical reader.

79. The method of claim 67, comprising the additional step of identifying a wirelessly accessible identifier associated with an object or a person via an electronic device for scanning wirelessly accessible identifiers.

80. The method of claim 67, comprising the additional step of identifying a user of the computer program via a biometric identification device.

81. A computer program product for managing customer inventory, comprising program instructions stored on at lest one computer readable storage medium which when executed cause a computer to:
(a) access, from one or more databases, at least the following stored data:
(1) customer inventory information,
(2) inventory and cost information for a plurality of manufacturers, suppliers, or distributors, and
(3) inventory restocking parameters provided by said customer;
(b) evaluate said customer inventory information and inventory or cost information for a plurality of manufacturers, suppliers, or distributors in light of said restocking parameters provided by said customer;
(c) order manufacturer, supplier, or distributor inventory which best fulfills said inventory restocking parameters provided by each said customer;
(d) track inventory items for (1) each customer and (2) each manufacturer, supplier, or distributor, as inventory items are added to, restocked to, or removed from inventory,
wherein said tracking step is executed by detecting each said inventory item and by updating said databases through at least one software interface to said databases;
(e) update said data on said one or more databases; and
(f) provide access to the information in said one or more databases to said customer, manufacturer, supplier, or distributor,
wherein said computer program product allows customers, manufacturers, suppliers, or distributors to be classified into groups, and where permissions or roles are assigned to such groups.

82. The computer program product of claim 81, further comprising program instructions for allowing the forecasting of inventory needs of said customer, manufacturer, supplier, or distributor based on inventory usage or inventory availability trends,
wherein said evaluation of customer inventory information and manufacturer, supplier, or distributor inventory and cost information is executed in light of said restocking parameters provided by said customer and said forecast inventory needs.

83. The computer program product of claim 81, further comprising program instructions for:
(1) monitoring inventory levels; and
(2) reporting anticipated shortages.

84. The computer program product of claim 81, further comprising program instructions for:
(1) monitoring inventory levels; and
(2) generating orders to cover anticipated shortages.

85. The computer program product of claim 81, further comprising program instructions for allowing users to order new inventory items or to supplement inventory when desired.

86. The computer program product of claim 81, further comprising program instructions wherein said step of ordering is completed automatically based upon the evaluation of said customer inventory information and said manufacturer, supplier, or distributor inventory and cost information in light of said restocking parameters provided by said customer.

87. The computer program product of claim 81, further comprising program instructions for allowing said step of updating to take place in real time.

88. The computer program product of claim 81, further comprising program instructions for identifying specially coded information on an object or a person via an optical reader.

89. The computer program product of claim 81, further comprising program instructions for identifying a wirelessly accessible identifier associated with an object or a person, via an electronic device for scanning wirelessly accessible identifiers.

90. The computer program product of claim 81, further comprising program instructions for identifying a user of the computer program via a biometric identification device.

91. The computer program product of claim 81, further comprising program instructions for permitting access to the information in said one or more databases, according to said assigned roles or permissions, to a user of the computer program identified via an electronic device for scanning wirelessly accessible identifiers associated with a person.

92. The computer program product of claim 81, further comprising program instructions for permitting access to the information in said one or more databases, according to said assigned roles or permissions, to a user of the computer program identified via a biometric identification device.

93. The computer program product of claim 81, further comprising program instructions for enabling registration and removal of individual users of the computer program product and modification of user information.

94. The computer program product of claim 81, further comprising program instructions for performing administrative functions.

95. The computer program product of claim 81, further comprising program instructions for:
(1) allowing inventory items to be grouped into classifications;
(2) allowing restrictions to be placed on distribution of such inventory items;
(3) permitting recording of information when individual inventory items or inventory items belonging to a particular group or set of groups are added to, restocked to, or removed from inventory; and
(4) allowing printing of inventory item specific or group specific labels or information to be included with each inventory item removed from inventory.

96. The computer program product of claim 81, further comprising program instructions for allowing users to specify a price for goods for sale within an inventory.

* * * * *

(12) EX PARTE REEXAMINATION CERTIFICATE (10416th)
United States Patent
Lucas

(10) Number: US 6,996,538 C1
(45) Certificate Issued: Nov. 24, 2014

(54) INVENTORY CONTROL SYSTEM AND METHODS

(75) Inventor: Michael T. Lucas, Calabasas, CA (US)

(73) Assignee: Unisone Strategic IP, Inc., New Castle, DE (US)

Reexamination Request:
No. 90/013,050, Nov. 4, 2013

Reexamination Certificate for:
Patent No.: 6,996,538
Issued: Feb. 7, 2006
Appl. No.: 09/799,879
Filed: Mar. 7, 2001

Related U.S. Application Data

(60) Provisional application No. 60/187,389, filed on Mar. 7, 2000.

(51) Int. Cl.
*G06Q 10/00* (2012.01)
(52) U.S. Cl.
USPC .......................................... 705/28; 705/26.41

(58) Field of Classification Search
None
See application file for complete search history.

(56) References Cited

To view the complete listing of prior art documents cited during the proceeding for Reexamination Control Number 90/013,050, please refer to the USPTO's public Patent Application Information Retrieval (PAIR) system under the Display References tab.

*Primary Examiner* — Michael J. Yigdall

(57) ABSTRACT

A system and method which allows third-parties to monitor company inventory via the Internet and World Wide Web ("web") and automatically order needed items. The present invention also provides a forum through which resellers and customers may directly interact to resell surplus and used equipment. The present invention may also allow a third party to act as a broker, thereby assuring that both the equipment purchased is actually delivered, and that the seller is properly compensated.

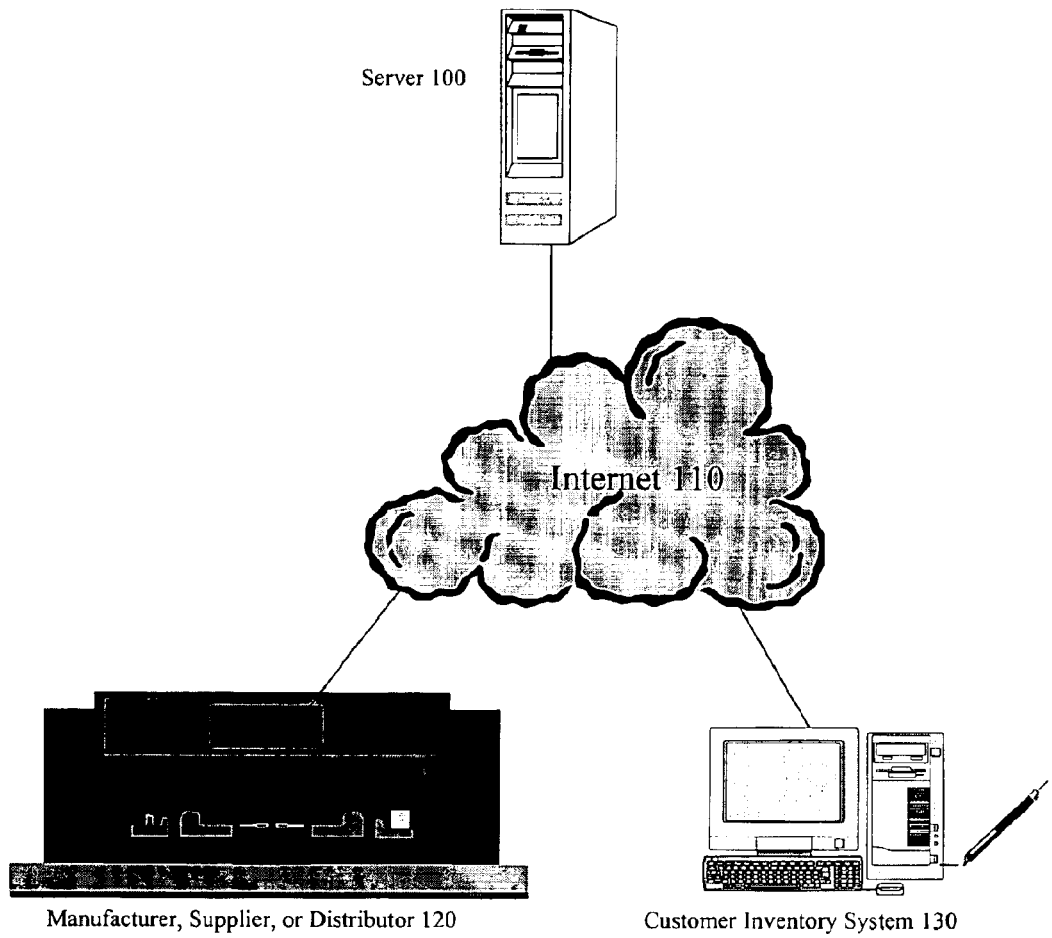

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 9, 10, 19, 32, 52, 67 and 81 are determined to be patentable as amended.

Claims 2-8, 11-18, 20-31, 33-51, 53-66, 68-80 and 82-96, dependent on an amended claim, are determined to be patentable.

1. An inventory management system, comprising the following elements, operably connected:
   (a) at least one computer having at least one storage medium;
   (b) one or more databases residing on said at least one storage medium, in which at least the following data is stored:
      (1) customer inventory information, *the customer inventory information including a number of items at a customer,*
      (2) inventory and cost information for a plurality of manufacturers, suppliers, or distributors, *the inventory information for the plurality of manufacturers, suppliers, or distributors including: a product identifier and a number of items in manufacturer, supplier or distributor inventory,*
      (3) inventory restocking parameters provided by said customer; and
   (c) client software residing on said at least one storage medium providing an interface to said one or more database(s), wherein the client software identifies users and allows users to be classified into groups, and wherein permissions or roles are assigned to such groups, and wherein:
      (i) said software evaluates said customer inventory information and [iventory] *inventory* or cost information for a plurality of manufacturers, suppliers, or distributors in light of said restocking parameters provided by said customer,
      (ii) said software automatically orders manufacturer, supplier, or distributor inventory which best fulfills said inventory restocking parameters provided by said customer in light of said evaluation,
      (iii) said software tracks inventory items in said databases for (1) *the number of items at* said customer and (2) *the number of items at* said manufacturer, supplier, or distributor, as inventory items are added to, restocked to, or removed from said inventories,
      *wherein said tracking is executed by detecting an RFID tag associated with each said inventory item,*
      (iv) said software updates said data on said one or more databases through at least one software interface to said databases; and
      (v) said software provides an interface through which said customer, manufacturer, supplier, or distributor can access the information in said one or more databases according to said assigned permissions or roles.

9. The inventory management system of claim 1, wherein said detecting of an RFID tag associated with each said inventory item is executed by one or more [REID] *RFID* readers.

10. The inventory management system of claim 1, wherein said [REID] *RFID* tag is read by a hand held electronic device.

19. A method for inventory management, comprising [the steps of]:
   (a) collecting and storing, on one or more databases having client software, at least the following data:
      (1) customer inventory information, *the customer inventory information including a number of items at a customer,*
      (2) inventory and cost information for a plurality of manufacturers, suppliers, or distributors, *the inventory information for a plurality of manufacturers, suppliers, or distributors including: a product identifier and a number of items in manufacturer, supplier, or distributor inventory,* and
      (3) inventory restocking parameters provided by said customer;
   (b) evaluating via at least one computer said customer inventory information and inventory or cost information for a plurality of manufacturers, suppliers, or distributors inventory or cost information for a plurality of users selected from the group consisting of customers, manufacturers, suppliers, and distributors in light of said restocking parameters provided by said customer;
   (c) ordering manufacturer, supplier, or distributor inventory which best fulfills said inventory restocking parameters provided by said customer;
   (d) tracking inventory items in said databases for (1) *the number of items at* said customer and (2) *the number of items at* said manufacturer, supplier, or distributor, as inventory items are added to, restocked to, or removed from said inventories,
   wherein said tracking [step] is executed by detecting an RFID tag associated with each said inventory item;
   (e) updating said data on said one or more databases, using information obtained in said inventory tracking [step], through at least one software interface to said databases; and
   (f) providing access via client software to information in said one or more databases to each said customer, manufacturer, supplier, or distributor,
   wherein said client software allows one or more customers, manufacturers, suppliers, or distributors to be classified into groups, and where permissions or roles are assigned to such groups.

32. A computer program product for managing customer inventory, comprising program instructions stored on at least one computer readable storage medium which when executed causes a computer to:
   (a) access from one or more databases, at least the following stored data:
      (1) customer inventory information, *the customer inventory information including a number of items at a customer,*
      (2) inventory and cost information for a plurality of manufacturers, suppliers, or distributors, *the inventory information for the plurality of manufacturers, suppliers, or distributors including: a product identifier and a number of items in manufacturer, supplier or distributor inventory,* and (3) inventory restocking parameters provided by said customer;
(b) evaluate said customer inventory information and inventory or cost information for a plurality of manufacturers, suppliers, or distributors in light of said restocking parameters provided by said customer;
(c) order manufacturer, supplier, or distributor inventory which best fulfills said inventory restocking parameters provided by each said customer;
(d) track inventory items for (1) *the number of items at* each customer and (2) *the number of items at* each manufacturer, supplier, or distributor, as inventory items are added to, restocked to, or removed from inventory, wherein said tracking [step] is executed by detecting an RFID tag associated with each said inventory item and by updating said databases through at least one software interface to said databases;
(e) update said data on said one or more databases; and
(f) provide access to the information in said one or more databases to said customer, manufacturer, supplier, or distributor,
wherein said computer program product allows customers, manufacturers, suppliers, or distributors to be classified into groups, and where permissions or roles are assigned to such groups.

52. An inventory management system, comprising the following elements, operably connected:
(a) at least one computer having at least one storage medium;
(b) one or more databases residing on said at least one storage medium, in which at least the following data is stored:
(1) customer inventory information, *the customer inventory information including a number of items at a customer,*
(2) inventory and cost information for a plurality of manufacturers, suppliers, or distributors, *the inventory information for the plurality of manufacturers, suppliers, or distributors including: a product identifier and a number of items in manufacturer, supplier or distributor inventory*, and
(3) inventory restocking parameters provided by said customer; and
(c) client software residing on said at least one storage medium providing an interface to said one or more database(s), wherein the client software identifies users and allows users to be classified into groups, and wherein permissions or roles are assigned to such groups, and wherein:
(i) said software evaluates said customer inventory information and inventory or cost information for a plurality of manufacturers, suppliers, or distributors in light of said restocking parameters provided by said customer,
(ii) said software automatically orders manufacturer, supplier, or distributor inventory which best fulfills said inventory restocking parameters provided by said customer in light of said evaluation,
(iii) said software tracks inventory items in said databases for (1) *the number of items at* said customer and (2) *the number of items at* said manufacturer, supplier, or distributor, as inventory items are added to, restocked to, or removed from said inventories,
(iv) said software updates said data on said one or more databases through at least one software interface to said databases; and
(v) said software provides an interface through which said customer, manufacturer, supplier, or distributor can access the information in said one or more databases according to said assigned permissions or roles.

67. A method for inventory management, comprising [the steps of]:
(a) collecting and storing, on one or more databases having client software, at least the following data:
(1) customer inventory information, *the customer inventory information including a number of items at a customer,*
(2) inventory and cost information for a plurality of manufacturers, suppliers, or distributors, *the inventory information for the plurality of manufacturers, suppliers, or distributors including: a product identifier and a number of items in manufacturer, supplier or distributor inventory,* and
(3) inventory restocking parameters provided by said customer;
(b) evaluating via at least one computer said customer inventory information and inventory or cost information for a plurality of manufacturers, suppliers, or distributors in light of said restocking parameters provided by said customer;
(c) ordering manufacturer, supplier, or distributor inventory which best fulfills said inventory restocking parameters provided by said customer;
(d) tracking inventory items in said databases for (1) *the number of items at* said customer and (2) *the number of items at* said manufacturer, supplier, or distributor, as inventory items are added to, restocked to, or removed from said inventories;
(e) updating said data on said one or more databases, using information obtained in said inventory tracking [step], through at least one software interface to said databases; and
(f) providing access via client software to information in said one or more databases to each said customer, manufacturer, supplier, or distributor,
wherein said client software allows one or more customers, manufacturers, suppliers, or distributors to be classified into groups, and where permissions or roles are assigned to such groups.

81. A computer program product for managing customer inventory, comprising program instructions stored on at [lest] *least* one computer readable storage medium which when executed cause a computer to:
(a) access, from one or more databases, at least the following stored data:
(1) customer inventory information, *the customer inventory information including a number of items at a customer,*
(2) inventory and cost information for a plurality of manufacturers, suppliers, or distributors, *the inventory information for the plurality of manufacturers, suppliers, or distributors including: a product identifier and a number of items in manufacturer, supplier or distributor inventory,* and
(3) inventory restocking parameters provided by said customer;
(b) evaluate said customer inventory information and inventory or cost information for a plurality of manufacturers, suppliers, or distributors in light of said restocking parameters provided by said customer;
(c) order manufacturer, supplier, or distributor inventory which best fulfills said inventory restocking parameters provided by each said customer;

(d) track inventory items for (1) *the number of items at* each customer and (2) *the number of items at* each manufacturer, supplier, or distributor, as inventory items are added to, restocked to, or removed from inventory,
wherein said tracking [step] is executed by detecting each said inventory item and by updating said databases through at least one software interface to said databases;
(e) update said data on said one or more databases; and
(f) provide access to the information in said one or more databases to said customer, manufacturer, supplier, or distributor,
wherein said computer program product allows customers, manufacturers, suppliers, or distributors to be classified into groups, and where permissions or roles are assigned to such groups.

\* \* \* \* \*